June 24, 1958    G. E. PELTON    2,840,218
TYPING APPARATUS AND SUPPLIES FOR TYPISTS TO
ENABLE THEM TO SECURE FINER WRITING
RESULTS AT LESS COST
Filed Dec. 13, 1954    5 Sheets-Sheet 1
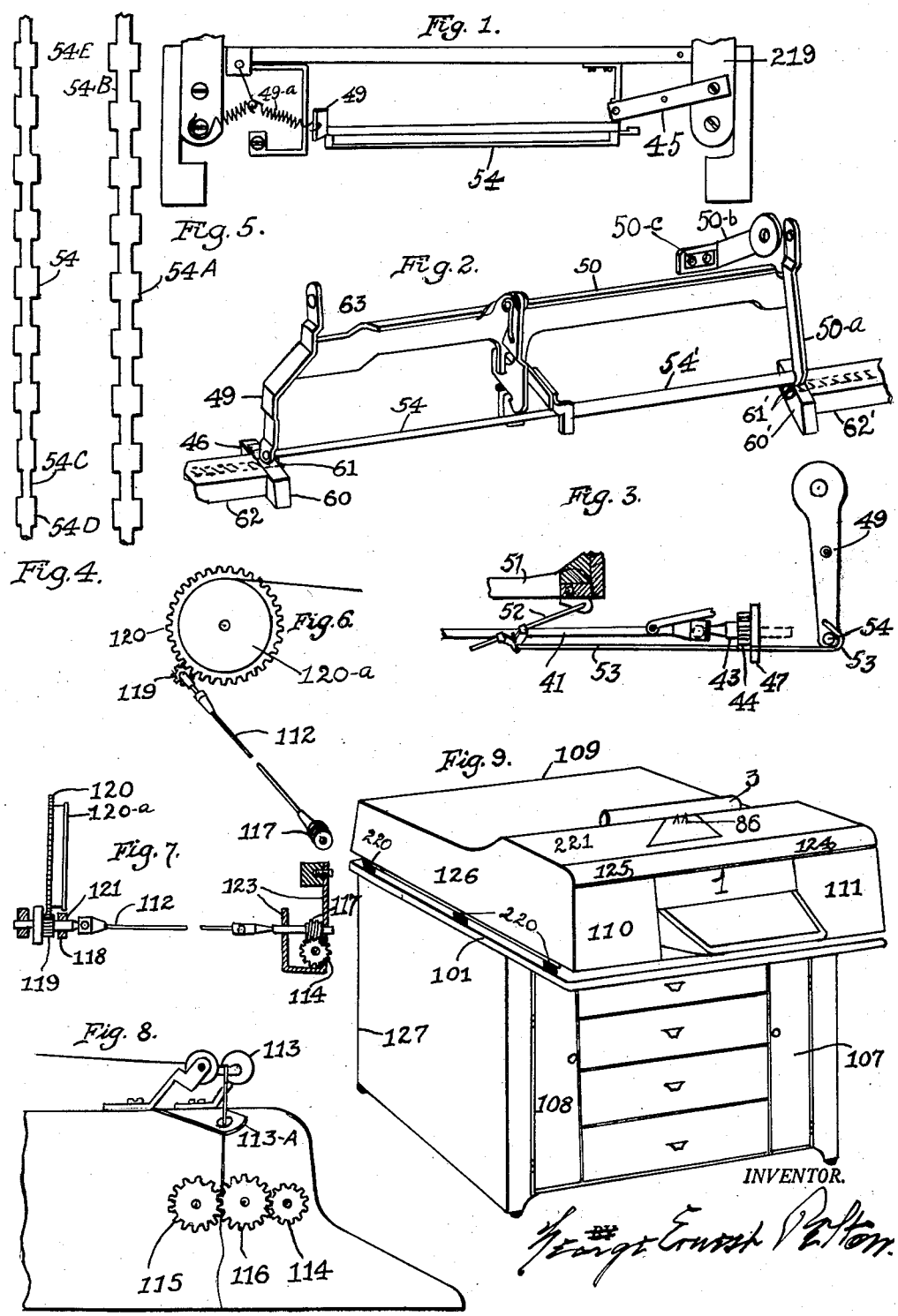
INVENTOR.
George Ernest Pelton.

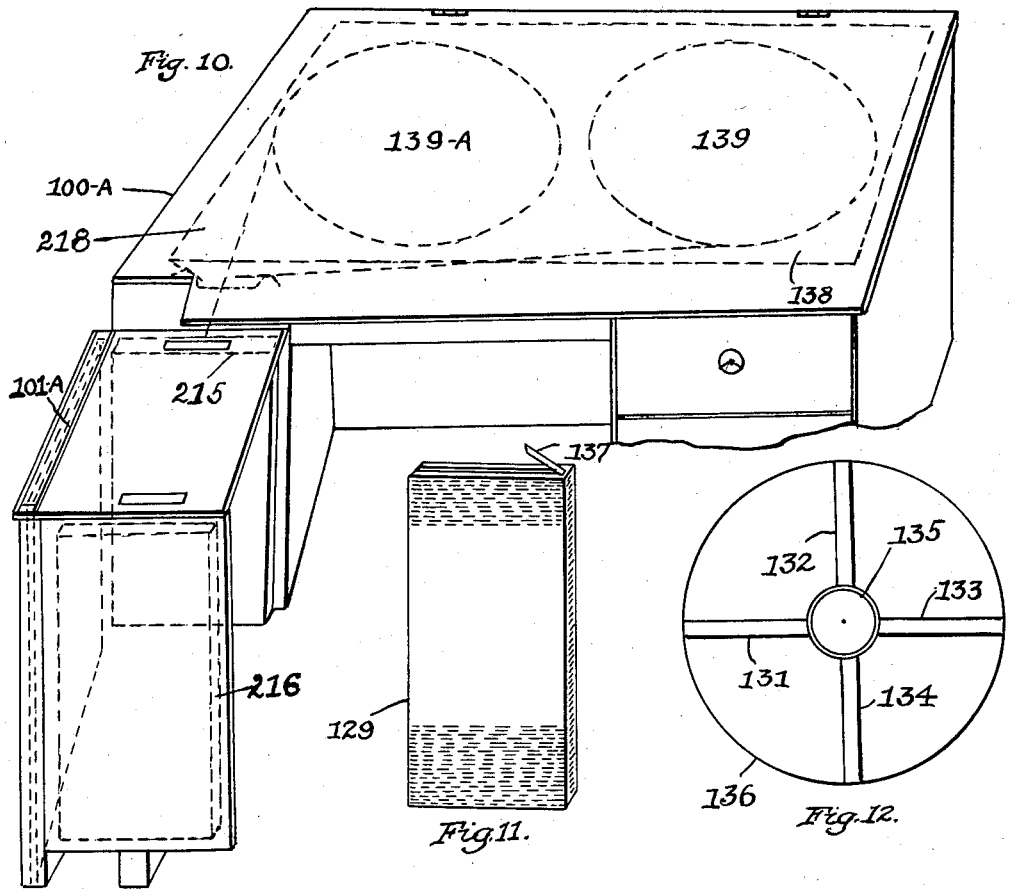
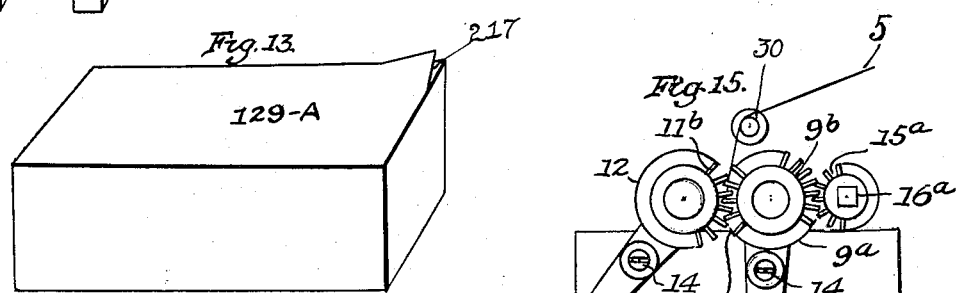
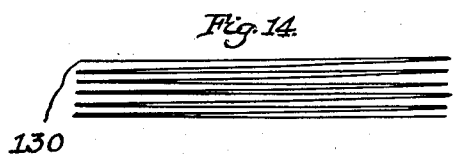
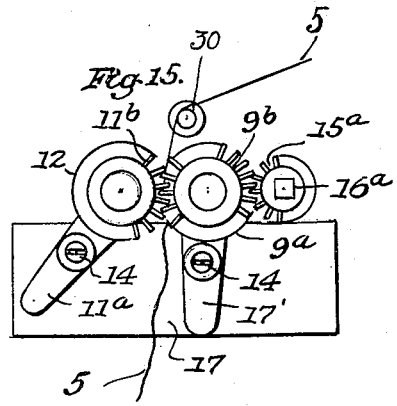
INVENTOR.

June 24, 1958 G. E. PELTON 2,840,218
TYPING APPARATUS AND SUPPLIES FOR TYPISTS TO
ENABLE THEM TO SECURE FINER WRITING
RESULTS AT LESS COST
Filed Dec. 13, 1954 5 Sheets-Sheet 3
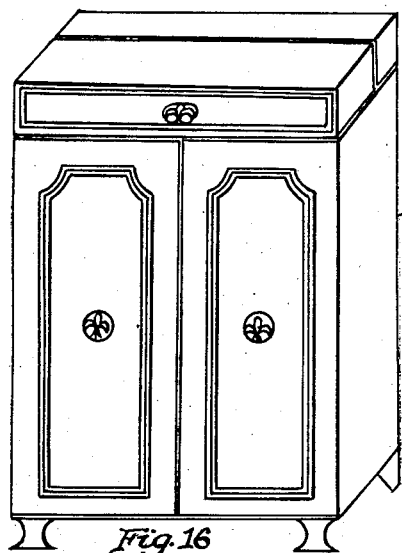
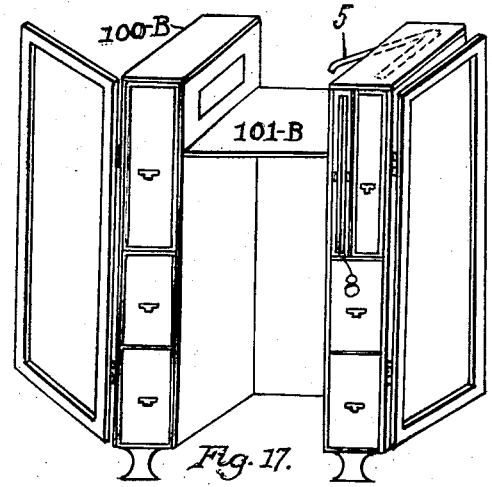
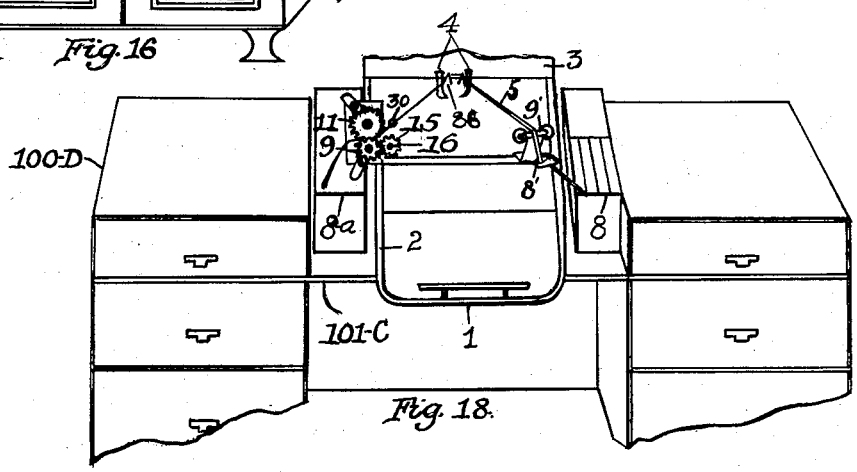
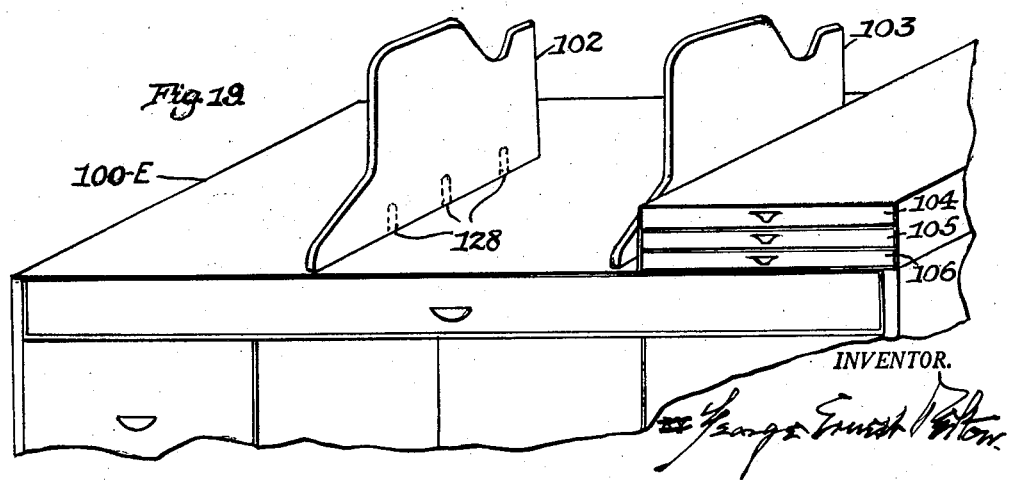
INVENTOR.

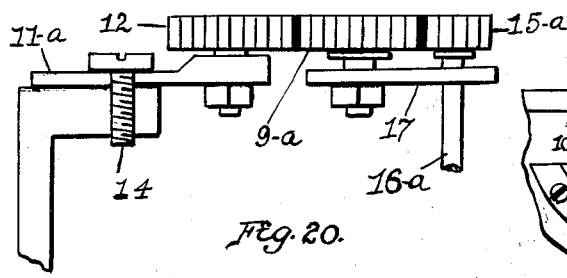
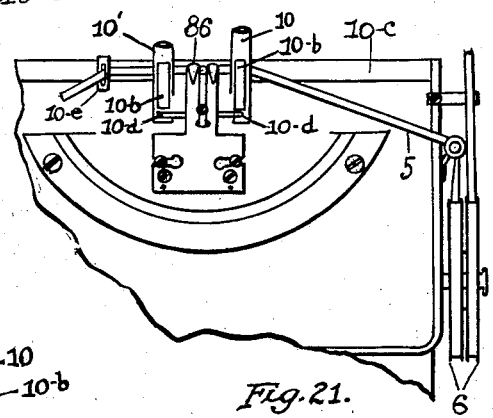
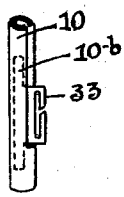
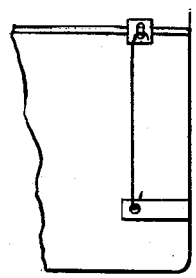
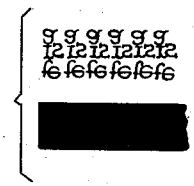
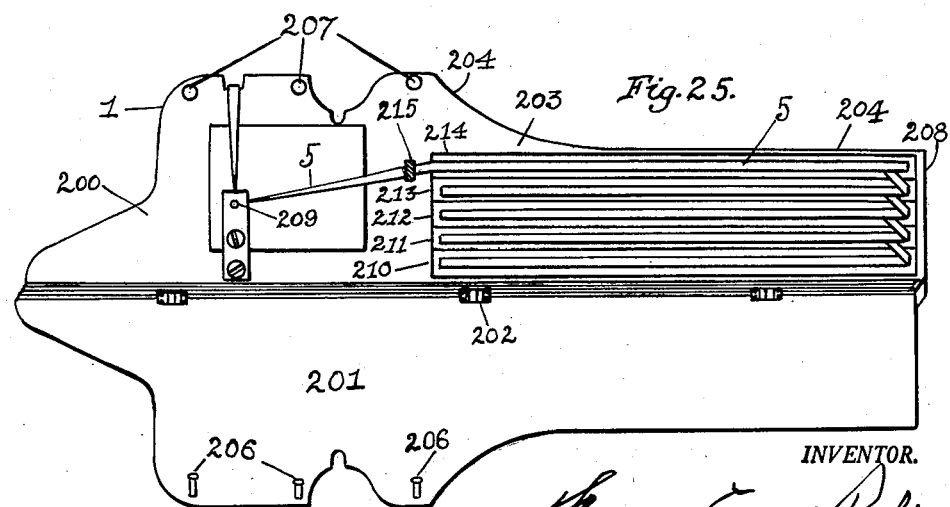

June 24, 1958 G. E. PELTON 2,840,218
TYPING APPARATUS AND SUPPLIES FOR TYPISTS TO
ENABLE THEM TO SECURE FINER WRITING
RESULTS AT LESS COST
Filed Dec. 13, 1954 5 Sheets-Sheet 5

INVENTOR.

United States Patent Office 2,840,218
Patented June 24, 1958

2,840,218

TYPING APPARATUS AND SUPPLIES FOR TYPISTS TO ENABLE THEM TO SECURE FINER WRITING RESULTS AT LESS COST

George Ernest Pelton, Round Hill, Va., assignor to Ida S. Pelton, Round Hill, Va.

Application December 13, 1954, Serial No. 474,941

33 Claims. (Cl. 197—151)

This invention relates to improvements in typing machines and to improved writing results from such machines and a greater quantity of writing of good clear, clean-cut impressions before a new ribbon is required. It relates to the use of fabric ribbons and ribbons made of unwoven material such as nylon film or other synthetic material and it also relates particularly to the use of carbon paper typewriter ribbons. The latter may be used with much more efficiency than ever before and at such low cost for fine writing as to make carbon paper ribbons far less expensive to use than silk typewriter ribbons which are made from wide silk cloth at low cost with gummed or treated edges to prevent fraying or raveling; and carbon paper typewriter ribbons may be used instead of cotton ribbons which cost as much as seventy-five cents each for a standard 12 yd. ribbon.

An object of one form of my invention is to use two, or even three paths along the face of the typewriter ribbon or typing machine ribbon, whether it is a carbon paper ribbon for fine writing for correspondence or legal papers, or for auditing records or bank or hotel records, where neat writing of good color that substantially matches always, is of high value, or whether it is a fabric or other ribbon used with an inking means which supplies ink in very small amounts with precision to a ribbon of a typing machine, and the various paths on the ribbon are used whenever writing is done with the typing machine or typewriter.

Heretofore it has been common practice in using typing machines equipped with inking mechanisms for supplying ink to a pure silk ribbon approximately 5/16 of an inch wide to have the metal type strike the face of the ribbon in one path and when that particular path along the ribbon becomes badly worn from long use to replace the fabric ribbon. An object of the present invention is to have the type strike the face of the fabric ribbon, or carbon paper ribbon, or other ribbon, in a much more efficient manner than heretofore so that if it is a fabric ribbon to which ink is being fed, the fabric will be used on each trip along the ribbon in at least two paths or even three paths; and the same for carbon paper ribbons that are used only once and this means that as they are used they are not passed through the vibrator of the typing machine again. My invention now makes it possible to make use of the ink on the face of a carbon paper typewriter ribbon that is 5/16 of an inch wide with a much higher degree of economy and efficiency so that very little of the ink on said paper ribbon is ever wasted although it makes just one trip past the writing point of the typing machine.

It is an object of the invention to eliminate the need for a typist to replace a carbon paper typewriter ribbon at frequent intervals as she now does if she is a speedy operator and does a large amount of typing each day.

Another object of the invention is to provide a new form of typing machine which is much more convenient for the typist to use and makes it practical for any typist who does from 20,000 impressions up to 65,000 impressions per day to be entirely free from any need of replacing a ribbon or installing a ribbon for at least six months or longer and she may have writing that matches all the time, year after year, if she desires such writing, and at low cost too.

It is an object of the invention to eliminate the need for a typist to remove a used ribbon from the machine or insert a new carbon paper typewriter ribbon if she uses one form of my invention.

Another object of the invention is to provide improved means for almost instantly changing the rate of travel of the ribbon during operation of the typing machine and improved means for changing back again to the original rate of travel or any other rate of travel which may be desired by the typist for her work. Once the typist sets the speed of travel of the ribbon, it will maintain that rate of travel through the ribbon vibrator, or through other means if the typing machine uses no vibrator; and if the typist desires to secure a larger number of impressions per inch of travel of the ribbon, in order to use the ribbon with still greater economy for still sharper, finer writing, she may almost instantly have just what is needed and she may do this by crimping means and she may also do it by other means described in much detail hereinbelow.

It is also an object of the present invention to provide the typist with a typing apparatus and equipment and accessories, including an improved typists' desk, which will add greatly to her comfort and satisfaction in her results and accomplishments and which will free her from the necessity on her part of having to put up with ribbon work that is too heavy or too dim in color, or too smeary and ugly for correspondence or for legal papers and other types of exacting work.

It is an object of the invention to provide typists with such large rolls of carbon paper typewriter ribbon located conveniently in a compartment of the typewriter itself or in a compartment (or compartments) of a special new desk, or in other suitable compartments, or on holders conveniently located to feed the ribbon, or ribbons, to the typing mechanism, that the typists will always have a freedom and enjoy a comfort in their work they have not known in the past.

Another object of the invention is to have certain letters of the alphabet always written from the upper portion of a narrow writing ribbon, which may be of fabric or of carbon paper, and to have other letters of the alphabet written from a slightly lower portion of the narrow writing ribbon, and as the type-bars operate in writing with a typing machine, the metal type will mark the ribbon. In other words the metal type e, y, t, d, l, f, may in accordance with my present invention always strike the upper portion of the ribbon. The metal type g, h, k, j, p, r, w, u, and q may always strike the writing ribbon in a slightly lower part of the ribbon; and the remaining letters of the alphabet may strike the ribbon in a still lower part of the ribbon, or they may strike in various parts of said ribbon; or for certain classes of work, my invention makes it possible to have the remaining letters of the alphabet not mentioned above, strike the ribbon in a part of the ribbon which is still lower than the portion of the ribbon used for g, h, k, j, p, r, w, u and q.

Another object of the invention is to provide a definite, simple method by which certain letters of the alphabet which may be used advantageously in the upper position of a narrow ribbon of any desirable width such as 1/4 inch or 5/16 inch or 1/2 inch or any other narrow width, may always be formed on the writing paper or writing surface, by having those certain metal letters contact the upper portion of the said narrow ribbon and also by the same method my invention makes it possible to have other letters of the alphabet formed from a lower position on the writing ribbon by the metal type of the typing machine during operation of the same and always from a lower position on the writing ribbon.

Another object of the invention is to provide a definite, simple method by which the alphabet may be carefully divided into three groups of letters and these groups may always strike the narrow ribbon in such various paths and positions as to utilize the ink supply of a narrow carbon paper ribbon or fabric or other type of writing ribbon with a high degree of efficiency and economy on one trip across and past the printing point, or in other words from approximately one end of said ribbon to the other end of the said ribbon. As it is now, conventional carbon paper typewriters use carbon paper typewriter ribbons wastefully and there is always a large amount of the inked face of such paper ribbons that is unmarked by the metal type especially if the typewriting machine used pica or smaller type. It is true that some carbon paper ribbons used in conventional typewriters are as much as ½ inch wide and a few typists may use the upper portion of a ½ in. ribbon in a straight, single path near the upper edge of the said ribbon and then may reverse said ribbon and actually be so eager to utilize more of the ink supply of said ½ inch ribbon before throwing it away, that said typists will carefully adjust their typing machines to write in a low position on the same all the length of the said ribbon, but this necessitates a moral quality and a feeling of thrift on the part of the typist which is extremely rare and it also means that the typists have to write with some discomfort until a new ribbon is installed which permits the use of the upper path on the said new ribbon since the red portion of a ½ inch ribbon is the conventional low portion of the ribbon and to write with the low portion of a ½ inch carbon paper ribbon means that the ribbon vibrator must be thrown very high for each letter impression made by the typist. Then there is another drawback and handicap. When using the low position of a ½ inch ribbon, especially when making capital letters or certain punctuation marks, there is great danger of tearing the ribbon across. Up to this time no carbon paper ribbon has been invented which does not tear easily and most of the paper ribbons have cut places and holes in them when they are used for one lengthwise trip past the printing point and this forces most typists to throw the ribbons away after such single trip. And, therefore, it is an object of the present invention to improve this situation and use carbon paper typewriter ribbons with high efficiency and high economy on one lengthwise trip past the printing point and it is an object of this present invention to give the typist such an easy movement of the vibrator with a ribbon only ¼ inch wide or 5/16 inch wide, if preferred, or a ribbon approximately 11/32 inch wide if desirable, that the typist will find it very comfortable and easy to use up substantially all of the ink supply on the face of the carbon paper typewriter ribbon on one time use.

Another object of the present invention is to increase the efficiency of the vibrator by making it narrower and of an improved design.

Another object of the present invention is to supply a type-bar guide of improved qualities suitable for use with the improved ribbon vibrator.

Another object is to provide an improved carbon paper ribbon typing machine which is capable of giving bold, dark, plain impressions that are as easily legible as when the ribbon travels through the vibrator as fast as in present conventional carbon paper ribbon typing machines but at a much slower speed so that the new invention may be used for filling in printed forms, parcel post and other shipping labels, for legal papers and documents needing bold impressions; but due to the higher economy and greater efficiency in the use of the ink supply of the one time carbon paper ribbon approximately half to two-thirds of the cost of present bold writing carbon paper typewriter ribbons may easily be saved; in addition, the typist may have writing that matches exactly for as much as several months before having to think anything about adding to her supply of ribbons. It is no longer necessary to use a speed control gear that is three inches in diameter in order to secure the best writing of richest color from a carbon paper ribbon as stated in applicant's pending application Serial No. 284,251, filed April 25, 1952, U. S. Patent No. 2,702,623, and applicant states that one of the objects of the present invention is to greatly increase the color of the writing from any given length of carbon paper ribbon over that secured at the present time from the inventions of his said application even though the inventions of that application show a marked lessening of costs for all those who would prefer to use carbon paper typewriter ribbons for correspondence and legal work and other office typewriting work.

An object of the present invention is to increase the efficiency and the economy of use of carbon paper typewriter ribbons that they shall cost no more than most of the fabric ribbons which give heavy writing at the start and soon give writing that is too dim, and give the public writing that always matches at no increase in cost and save the typists from having to bother about installing ribbons at frequent intervals and save them from having to clean the type and also save them the time of having to remove used ribbons of any kind.

Another object is to give very bold, heavy inked impressions from two paper ribbons, one of which may be an uninked paper ribbon next to the type.

Another object is to make it less expensive to use ribbons of various colors of ink and quickly change to a ribbon of any desired color and write with such color of ink as much as desired and then almost instantly change back again without any winding of spools or cranking and without any bother of any kind and without any need of removing a spool of used ribbon or winding up any used ribbon.

Another object is to provide an improved universal rod or bar and frame and efficient supports for the same, including a rod or bar that is interchangeable so that the user may have such letters strike the upper portion of the carbon paper typewriter ribbon or other inked ribbon as the customer desires and have such an arrangement of the letters desired for striking any other portion of the writing ribbon as may be desired and may also change the arrangement as desired by changing the universal rod of the universal frame.

I have made the discovery that it is possible to have writing from just one trip along a carbon paper typewriter ribbon of any desired length up to many months of steady service, that will utilize the ink supply almost completely and it is, therefore, an important object of the invention to provide an improved means for carrying any desired length of carbon paper inked ribbon of suitable width from one thousand yards up to one hundred thousand yards; such carrying means to be of such efficient construction as to never require any attention from the typist and to enable her to have the same comfort in using her typist's new working tools and equipment whether her ribbon supply is 1,000 or 100,000 yards.

It is an object of the invention to provide a typing machine having side plates which serve also as parts of a compartment of considerable size in the rear of the machine and said compartment housing a supply of carbon paper ribbon.

It is an object of the invention to provide a typing machine that has but one spool shaft and is free from any spools in the machine itself or in the ribbon compartment, in one form of my invention; also free from a ribbon reverse mechanism and free from a transverse shaft (and gears) such as is used in conventional typing machines having a right vertical spool shaft and spool; and free from any universal joint connection at the rear end of the drive shaft of the typing machine; and free from any mechanism for shifting the ribbon so that all of the metal type of the machine will write just along the upper path of the ribbon or just along one lower path of the ribbon as with conventional typing machines; and in using the new invention the type may write on the upper portion of the ribbon and the middle portion of the ribbon and the lower portion of the ribbon in writing a word of only a few letters as will be shown in detail hereinbelow. In other words, with the new invention, when writing with the ribbon it is customary to do just the opposite of usual practice and I, therefore, use the ink from the various parts of the ribbon, leaving as little wasted ink as possible and this is done on just one time use of the carbon paper typewriter ribbon.

It is also an object of the invention to provide a typing machine that is less expensive to construct, is more efficient to use and is more economical to use and one that rarely cuts into the carbon paper typing machine ribbon because of its metal type having dull, non-cutting edges; a machine that will produce writing that substantially matches, that is of the desired weight of ink for various kinds of typing and will use paper ribbons, fabric ribbons, synthetic fibre ribbons, ribbons from nylon or other wide film or sheets, with great economy.

And now applicant states that he has by reason of the present invention a new object, namely: to give five times as much writing of good rich color from a carbon paper ribbon as is now given by carbon paper ribbon typewriters now for sale, when pica type is used with dull edged type faces in the new carbon paper ribbon typewriter of his invention; and to give five inches of such writing for each inch of 5/16 inch wide carbon paper ribbon used on one trip through the vibrator and past the printing point of the typewriter of his present invention even when the typewriter is so built that the ribbon moves when the carriage moves or when the space bar is struck in writing and even when the ribbon moves when spacing between words or after punctuation marks; and it is a further object of his present invention to give sufficient ink in the written impressions when the writing is lightly inked writing and very sharp writing from fairly sharp-edged type, when only one inch of 5/16 inch wide carbon paper ribbon is used for seven inches of pica type writing if the carbon paper ribbon typewriter of his invention is so built that the ribbon does not move when spacing between words and after punctuation marks; and for use with elite type, in the latter type of typewriter, it is an object of the present invention to give eight inches of sharp lightly inked writing for each inch of 5/16 inch wide carbon paper typewriter ribbon used; and it is, therefore, an object of the present invention to make it possible for all letter writing in offices to be done with carbon paper typewriter ribbons at much increased comfort and efficiency for the typist and her employer and at a great saving in expense for typewriters and ribbons, over present conventional carbon paper ribbon typewriters and carbon paper ribbons; and it is an object of the present invention to make it so inexpensive to use carbon paper ribbon typewriters and carbon paper typewriter ribbons that the present practice of using silk and nylon and good grade of cotton ribbons will be discontinued entirely in progressive, modern offices where efficiency and good results are valued highly by reason of the lower cost of producing the new kind of typewriter because of its fewer parts and because of its greater simplicity and much higher efficiency in producing writing of quality at low cost when used with fairly large rolls of carbon paper typewriter ribbons for one time use through the ribbon vibrator and past the printing point. And it is also an object of this invention to make it possible for the typist to have black writing with a slight amount of ink in impressions and almost instantly to change to a ribbon that will write with high efficiency and economy and will give much darker writing.

And it is a further object of this invention to supply typists with inked rolls of carbon paper ribbon having means for securing the ribbon in its rolls in a new manner which is more efficient than to have said rolls of ribbon simply wound up, in the manner of present conventional carbon paper ribbon rolls; and it is a further object to have said rolls of ribbon unwind under slight restraint by reason of adhesive strips on at least one face of a roll of ribbon thus insuring more efficient feeding of the ribbon to the writing mechanism.

And it is a further object of this invention to supply the typist with a new type of carbon paper ribbon for typing machines with an improved edge and an improved fastening for the edges of the ribbon laps in each roll on at least one face of the roll of ribbon.

And it is an object of the invention to supply a vibrator mechanism for moving the carbon paper ribbon or other ribbon correctly for writing in more than one path on the ribbon so the type force ink upon a writing surface from more than one path or zone during one trip of the ribbon past the printing point which is superior to present ribbon vibrators of carbon paper ribbon machines, and a type of vibrator which can be easily applied to typing machines of many kinds at low cost for assisting in securing much more writing of good color per inch of carbon paper ribbon used.

Applicant states that it is an object of the present invention to make it easily possible at small expense to install his invention in used typewriters that are being overhauled and repaired and modernized and to make such machines capable of giving the new fine results in writing at low cost from carbon paper typewriter ribbon which gives writing that matches for six months or longer before a new supply of carbon paper ribbon is needed. Rebuilt typewriters for the office and for the home, when equipped with the new invention can give a greatly improved writing result never before had in any new typewriters and a result that cannot be had today from any typewriters now for sale anywhere and it is an object, therefore, to encourage the rebuilding of used typewriters for the office and for the home so that typists may have the new improved results and have writing that gives just the color and weight of ink in the writing that meets the discriminating wishes of the typists and at low cost.

Applicant states that it is an object of the invention to provide typing machines with as few parts as possible for users who are very interested in extremely low-cost machines that are capable of superior results from carbon paper ribbons and to this end it is an object of the present invention to eliminate from said extra-low cost typing machines a line-lock crank and a line-lock bail and any ribbon control mechanism for lowering the ribbon so the type can not make any impressions from the ribbon at all, and all typewriter ribbon spools may be eliminated from the typewriter and from the compartment where the ribbon supply is located and the right-hand spool-shaft and its supporting structure and the gear attached to the bottom of said spool-shaft may be eliminated in one form of my new invention. It is an object of the present invention to eliminate from one form of the typing machine of my invention all housing now used under typewriter ribbon spools and also to eliminate the present expensive enameled finish of not only the usual side plates but also certain other parts of the typing machine and to make the appearance of the machine still more attractive than at present by new and novel ways which are less expensive and which are attached to a new type of typist's desk which is hereafter described and which is much more efficient and adds to the comfort of the typist.

It is an object of the present invention to supply one form of the invention by which the typist will not have to install any new supply of carbon paper ribbon for at least one year even though she averages 40,000 impressions per day, six days per week from a pica or elite type carbon paper ribbon typewriter. And this typewriter may be free from any universal joint connection.

It is an object of the invention to make it possible for the typist quickly to insert writing that is as black and bold as the first six words on this page and in a flash return to writing like this writing or still lighter writing or writing of a different color of ink such as brown, blue, red, purple or green; and without having to stop to wind any spool or remove any spool of ribbon, to instantly return to the usual black writing the typist usually does as standard.

It is a further object of the present invention to cause the type characters to crowd each other very closely, in at least two different zones of the ink transfer member or ribbon, so closely that the vertical or upright lines of successive impressions may not clear each other at times, and on just one trip of said ribbon past the printing station or printing position or typing station; and the writing secured in this manner will always substantially match in color and have beautiful, printlike outlines and such impressions are very economical.

It is a further object of the present invention to make inked impressions on a writing surface with type characters of a given width and to impress the dull-edged or other kind of type against a backing member at a typing station, and advance the writing material or sheet laterally past the said station between the type characters and the backing in steps of greater length than the width of the said type characters, even four or five times greater length than the width of the said type characters, if that be desirable at times, and also to advance a carbon paper ribbon or other ink transfer member between the type characters and the writing material or sheet material, in steps of much lesser length than the width of the widest of said type characters, even though this causes the upright or vertical portions of successive characters to fail to clear each other; and the writing secured will substantially match in color.

It is a further object of the present invention to use a new method of making inked impressions on a writing surface or sheet material of any desired type or kind with type characters of the alphabet and punctuation marks, etc., of suitable size such as pica or elite or micro, etc., which comprises the steps of intermittently impressing the type characters against a backing member or platen at a typing station or printing position, and advancing the sheet material laterally past the said station between the type character and the backing in steps of greater length than the width of the widest type character and also advancing a carbon paper ribbon or other ink transfer member between the type characters and the sheet material in steps of lesser length than the width of the widest of said type characters, and in steps of such length that the marks of the type characters against the face of said ribbon or transfer member will be very closely crowded together in at least two longitudinal paths or zones of the said ribbon or transfer member, and said zones may overlap one another if desirable; and the vertical lines of successive type characters made on a face of said ribbon or transfer member may fail to clear each other completely, and the writing secured will substantially match in color and beauty week after week and month after month if a ribbon of suitable length is provided; and it is the object of this invention that such ribbon shall be extremely economical so that it will be no more expensive for the public to use than present cotton inked ribbons.

It is an object of the present invention to provide ways and means that will be later described herein wherein beautiful writing may be secured from carbon paper ribbons which pass from a disk carrying one or more rolls of such ribbon, and the ribbon may be secured on at least one face with circles of any suitable material on which are narrow strips or threads of adhesive material or coated material of any suitable kind suitable for laying on at least one face of a roll of carbon paper ribbon or other ink transfer material in rolls, so the threads or strips or other adjacent adhesive material already attached to said circles, or otherwise conveniently arranged, may be used for holding one or more rolls of ribbon in place when mounted on a disk or otherwise for feeding to a ribbon vibrator of a typing machine so that said disk may be full of ribbon at the start of the use of said machine, without danger or risk of any of the ribbon falling down below said disk and causing trouble and without the use of any housing or other means beneath said disk to keep said ribbon from falling down or failing to stay in its proper place or plane; and said ribbon may pass from the cabinet or compartment holding said disk loaded with ribbon, in a suitable manner to a ribbon vibrator of said machine and be used so that marks on said ribbon show that two zones or paths on a face of said ribbon have given off ink correctly to a writing surface in such an efficient manner that said ink has been used with much higher economy than and given at least three times as much writing for each inch of ribbon used or even up to seven or eight times as much writing for each inch of ribbon used, as conventional carbon paper ribbons now give when used in conventional carbon paper ribbon typewriters.

And it is a further object of the present invention to utilize inked ribbon wound helically about a core or center in convolutions, with the side edges of said ribbon convolutions defining side faces of a thin, compact package of inked ribbon, with adhesive tape or other adhesive material secured to portions of a side face of said wound ribbon, or to both faces of said wound ribbon, for the comfort and convenience of the typist during use of typist's tools.

And it is a further object of the present invention to provide means and apparatus and equipment for a typist whereby when she is writing with a typing machine, she will have the said ribbon automatically and successively positioned so that on a single trip through the typing station, she will utilize ink from the said ribbon from a plurality of zones thereof for writing that matches and said ribbon will travel so slowly through said station that it will be marked by the type with many impressions which overlap and crowd each other in said zones.

And it is a further object to provide means for advancing the writing sheet in steps of lesser length than the width of the type characters, and almost instantly change the length of advance of said ink transfer member to vary the quantity of ink transferred from said transfer member to said writing sheet.

And it is an object of the invention to provide means to advance the carriage of the machine stepwise past the typing station and to move an inked ribbon having a plurality of laterally overlapping longitudinal zones, much slower than is conventional, and to position said ribbon between said carriage and the type characters of the machine at the said station, so as to have the type strike or press the ribbon in different zones and so as to crowd impressions made by the type against each other in said zones on a single passage of the ribbon through the typing station for writing that is of unusual quality and at slight cost.

It is an object of the invention to provide a typing machine having only slightly more than ¾ as many parts as the usual machine which is made for using carbon paper inked ribbons for conventional typing of letters, etc. and also to provide for passing a disposable ribbon from a large ribbon supply past the typing station and to provide a special desk of my invention having a chamber rotatably mounting a supply of said disposable ribbon, and means for feeding said ribbon from said chamber in any desired and suitable manner to the station for writing on a sheet of paper that is of any desired quality and color, and writing that matches in appearance for some months before a new ribbon is required; and said ribbon may move so slowly that vertical portions of the character impressions successively made by the type on the ribbon will fail to clear; and said carbon paper ribbon machine being less expensive to make than usual typing machines using carbon paper ribbons and the ribbon is much more economical to use.

It is a further object to provide a bulk supply of carbon paper ribbon or synthetic ribbon which is in the form of folded ribbon, neatly arranged in a suitable pile with the plane surfaces of said pile of ribbon fairly smooth and with suitable adhesive tape or other adhesive means on at least a portion of at least one of the plane surfaces of said pile of inked ribbon so that the edges thereof may be secured releasably. The said ribbon may be folded in any suitable way or may be folded in a standard folding machine which folds paper in zigzag or accordion pleated fashion and the said paper may be carbon paper. It may be cut in inked ribbons of ¼ inch width to ½ inch width or any narrow width desired for any typing machine. Or the inked ribbon may be arranged in a suitable compartment in any manner ready for feeding to the vibrator of the machine.

It is a further object to supply the typist with a special desk which has a compartment in the rear of the typing machine or in any other suitable place separate and apart from the typing machine, where one or more slots or narrow openings in the said compartment may carry a bulk supply of inked ribbon and all of the same may be one continuous strip of any desired length or width of ribbon.

It is an object to supply a typing machine free from any spools or disks or rotary members of any kind for holding a bulk supply of ribbon and to have said ribbon of said bulk supply feed to said machine from a carton or other box which may be thrown away when the said bulk supply of ribbon is exhausted, thereby permitting the customer to avoid the expense of any spools or cores or small boxes.

It is a further object of said invention to provide a typing machine having an unfinished skeleton frame and having no spools and having means for moving the ribbon but one time in one direction only and to provide a machine with a casing which may cover and hide the skeleton frame and said casing may be attached to the said machine or it may be a part of the typist's desk; and there may be one or more chambers or compartments of said machine or of said desk for housing the folded bulk supply of inked ribbon of suitable width.

It is a further object of the invention to provide a typing mechanism that has a carriage which moves the same distance step by step for letters, whether lower case or capital letters, and which is without means for changing to other sizes of type readily as in the Varityper machine; and the type are fastened to the typebars; and the machine has no reversing mechanism and no spools; and the ribbon used in the machine is connected with a bulk supply located separately from the said machine in an article of furniture such as a cabinet or compartment of a desk or in a metal or wooden member which fits into a part of said desk or into an article of furniture of any suitable kind; and said ribbon may be folded in such manner as permits it to feed to the machine and to the typing station and to the area for receiving used ribbon, without any twists in the ribbon. The machine has means including only two drive shafts (one of which may be horizontal and the other vertical and both on the same side of said machine) which are actuated by the movement of the paper carriage, for traversing the ribbon through the typing mechanism in operative relation to the carriage and type-bars, and in one direction only from the bulk supply of ribbon which may be folded or otherwise, or it may be ribbon in the form of a roll or rolls.

It is an object of the invention to provide a typing machine which makes it unnecessary for the typist ever to remove a spool of used ribbon from it or to install a spool of ribbon in the machine, for one form of my invention; and if the bulk supply of ribbon is nearly exhausted, the end of the new ribbon may be fastened to the end of the old ribbon with adhesive tape, such as Scotch tape, and the new ribbon will be easy to move into the machine instantly either by moving the carriage manually for an instant or by rotating the pulling members manually, which pull the ribbon into the typing station and through the machine. In one form of my invention, there is no need whatever for many additional members commonly used in standard typing machines as I will later herein show.

It is a further object of the invention to provide a method of securing neat typed impressions with maximum economy of ribbon consumption and impressions that may always substantially match in color and appearance and at the same time make it unnecessary for the typist to clean the type of a typing machine and make it unnecessary for her to take more than a few seconds to attach a new ribbon to the end of her old ribbon and then write for months from the new ribbon.

For the richest color in the writing, I no longer have to use ribbon wastefully and it is an object of the invention to use much less ribbon per inch of writing than was necessary at the time I filed my pending application No. 284,251 in which it is stated on page 23 thereof that for the richest color in the writing I use substantially the same number of inches of ribbon as writing secured.

Other objects and advantages of the invention will become apparent from the following detailed description of the accompanying drawings, in which:

Fig. 1 is a top plan view of the suspension means (or supporting means) for my improved universal bar.

Fig. 2 is a perspective, front, elevational view of the structure shown in Fig. 1, with one of the selected universal bars associated therewith.

Fig. 3 is a fragmentary, side elevation showing the manner in which the operating link for the universal bar connects with the latter.

Fig. 4 and Fig. 5 are side elevations showing varied forms of universal bars which may be used in carrying out the invention for various types of machines.

Fig. 6 is a detail view showing the spring drum casing of a conventional typing machine and the spur gear driving connection for rotating the ribbon feed control shaft.

Fig. 7 is a detailed, fragmentary, sectional view, in front elevation, showing more clearly the drive connection as disclosed by Fig. 6.

Fig. 8 is a side elevation of a portion of a typewriter frame and showing the ribbon, after being used, being fed into a waste receptacle.

Fig. 9 is a perspective view showing a design of desk for the accommodation of a typing machine suited to one form of my invention and disclosing compartments for conveniently housing a bulk supply of inked ribbon to be fed through the typing zone or station as well as a compartment for the reception of used or expended ribbon.

Fig. 10 is a perspective view of a portion of a modified form of desk varying from that disclosed in Fig. 9 and disclosing a plurality of rolls (in dotted lines) for containing ribbon to be fed to the machine.

Fig. 11 is a perspective view of a container for the accommodation of inked typing machine ribbon to be housed in folded form (zig-zag folded form).

Fig. 12 is a roll of inked ribbon for use in connection with my improved feed mechanism and illustrating means whereby the ribbon may be so held together that it will be in no danger of accidental or casual unwinding from the roll.

Fig. 13 is a perspective view of a container for a multiplicity of stacks of ribbon (all formed from a continuous narrow ribbon) and to be fed therefrom in linear fashion.

Fig. 14 is a side elevation disclosing a ribbon in zig-zag, folded form.

Fig. 15 is a top plan view showing the left vertical spool-shaft of a conventional typewriter with a spur gear attached thereto and in mesh with a feeder gear for determining the linear speed of the ribbon through the typing station.

Fig. 16 is a perspective view of a desirable and neat design for a cabinet for the home which may accommodate any size typewriter desired together with a very large bulk supply of folded ribbon ready for long use, and this ribbon may be so arranged that for years no new ribbon will be required in the machine and the ink of the carbon paper ribbon will not dry out or deteriorate.

Fig. 17 is a view of a modified form of cabinet for use in the home, and the ribbon may be in rolls or in zig-zag folded form.

Fig. 18 is a front perspective view of a desk and typing machine and illustrating a zig-zag folded ribbon nearby and also a waste area on opposite side.

Fig. 19 is a fragmentary, perspective view of a further modified form of desk showing the housing for a number of stacks of folded ribbon.

Fig. 20 is a fragmentary view showing the left vertical spool-shaft carrying a removable gear and in mesh with a feeding gear (see Fig. 15).

Fig. 21 shows a conventional typing machine having a plurality of spools of ribbon rotatively mounted at the right-hand side of the machine ready for use.

Fig. 22 is a detail, perspective view of one of the tubes which are mounted on opposite sides of the typing station showing the manner in which the vertical, reciprocable rods, with ribbon guides fastened thereto permanently, operate therein.

Fig. 23 shows one means for adjusting the mechanism to lower or raise the position which it is possible for the ribbon to assume in the typing station.

Fig. 24 is a reproduction of a series of type characters which were written with a carbon paper ribbon, on a perfectly white ribbon with white ribbon towards the platen, both ribbons being 5/16 of an inch wide, to show that on one trip of the inked ribbon through the typing station, the type characters used ink from at least three paths on the inked ribbon and used ink clear across the ribbon efficiently.

Fig. 25 is a side elevation of a frame for use in housing one form of typing machine, which frame carries a compartment for housing a bulk supply of zig-zag folded ribbon properly inked, as well as a compartment for use of expended ribbon.

Figure 26:
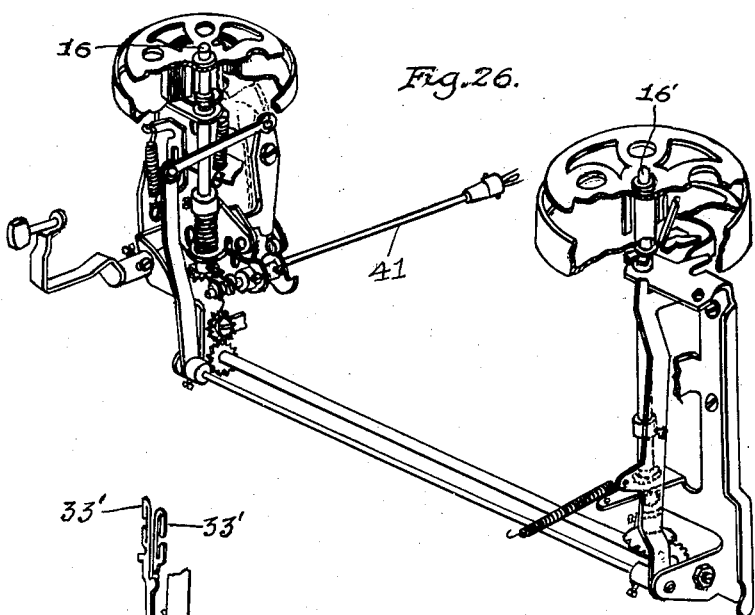

Fig. 26 is a detail, perspective view of a conventional ribbon mechanism of a very popular, famous typewriter and illustrating how the ribbon is moved through the typing station and moved back and forth from one spool to the other until the ink of the fabric ribbon is virtually exhausted; and illustrating those parts of the left-hand mechanism shown which are needed and those which are eliminated by the new invention.

Figure 27:
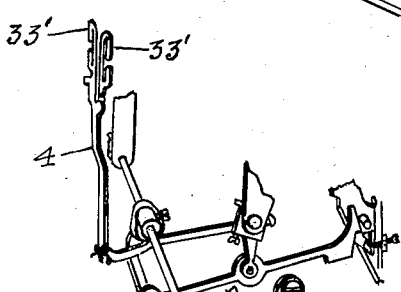

Fig. 27 is a detail, perspective view of a mechanism of the same form of popular typewriter mentioned in the preceding paragraph and said mechanism illustrtrates conventional parts of the mechanism which controls the position of the ribbon vibrator.

Figure 28:
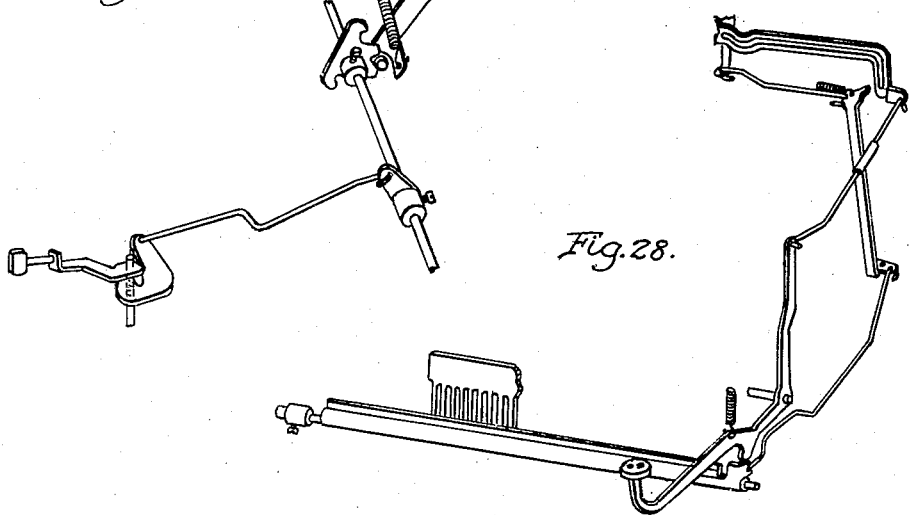

Fig. 28 is a perspective view of parts of the same famous typing machine, parts which may now be mostly eliminated at considerable saving to the manufacturer, all by the use of my new invention, thereby increasing the efficiency and simplicity of the typing machine; and the cost should be lower to the consumer.

In carrying my invention into effect, many parts of the standard typewriter or typing machine, are eliminated because they are no longer of use to the typist and simply add to her difficulties. In Fig. 26 all of the parts shown on the right-hand side are eliminated and the two long transverse shafts are eliminated and many of the parts on the left-hand side are eliminated, particularly the parts shown which have to do with the reversing of the spool on the left-hand spool-shaft 16. For the most efficient use of the new invention, no spools are desirable or needed. In one or two forms of the invention spools can be used.

I realize that the efficiency of present carbon paper ribbon typewriters, which use twenty inches of ribbon to do only twelve inches of writing, could be vastly improved by the use of the present invention even though they continued to employ their present spools so I do not limit myself to spoolless typing machines. I do not limit myself to machines which write in one path only, or in two paths on the ribbon only, or in more than two paths on the ribbon only, and at the same time making use of other inventions of mine described herein such as the important zig-zag folded ribbon which is of revolutionary effectiveness. With the zig-zag folded ribbon, no ball-bearing mounting is required for a roll of ribbon to enable the roll to unwind almost free from tension. The folded ribbon does feed to the typing machine free from any appreciable tension whatever regardless how long the folded ribbon may be.

In carrying one form of my typing machine invention into effect, certain parts of the standard ribbon feed mechanism at present employed are eliminated and in their stead are applied devices of my invention whereby the step by step feed of the ribbon is effectively carried out and at the same time the ribbon is moved in up and down direction for more efficient use of the ribbon's ink supply so that it is inexpensive to make use of a carbon paper ribbon for beautiful writing, with no necessity for the typist to ever clean the type because they never come in contact with any ink whatever. By the more efficient use of the ink supply of the ribbon, the typist may have one hundred inches of writing of good, rich color from twenty inches of ribbon, which means that even users of very ordinary letter paper may have neat, good-looking writing from typing machines. The typing machines should be less expensive also. It is logical and fair and reasonable that the finest writing should be had by the most complete use of the ink supply of a 5/16 inch wide carbon paper ribbon and that is what my invention has made possible by utilizing the ink in a number of paths of the ribbon's face. It is desirable that the ink be used from the ribbon not only longitudinally but transversely thereof as well on just one trip of the ribbon through the ribbon vibrator, if the ribbon is only 5/16 of an inch wide, or less. It is also desirable to supply the typist with such a typing machine that she will not have to stop her work frequently to remove a spool of used carbon paper ribbon as she does now because so little ink is used from the ribbon and it travels much too fast through the machine. It is desirable that she have a ribbon that will give her writing for months. By using the ink supply much more efficiently and by providing a bulk supply of ribbon, the typist is given new comfort. Much of this comfort comes from the economy size roll of ribbon; still more from the economy size package of zig-zag folded ribbon.

The means by which the typist secures great efficiency in the use of the ink supply of the ribbon and gains the use of a more efficient, less expensive and more suitable typing machine, I shall describe in the following pages.

In the accompanying drawings (see Fig. 18) for the purpose of illustrating certain embodiments of my invention, it is shown as applied to a typing machine 1, having a frame 2, platen 3, ribbon vibrator 4, inked ribbon 5, disk or reel 6, and the desk used by the typist is 100. Conventional portions of the typing machine, no longer needed in the machine of my invention, have been omitted from most of the drawings.

I now refer to page 5, line 33 beginning with the word "Spools" of my U. S. Patent 1,826,568 for a detailed description of the usual back and forth movement of a fabric ribbon in a typing machine.

The universal bar frame 49 illustrated in Fig. 8 of my U. S. Patent No. 1,826,568 swings forward about a transverse shaft 50 from the normal position shown in said Fig. 8 on the down stroke of the type-key, each of the type-bars 51 of the machine being actuated to print by its associated key through the medium of a link 52, which link rocks the universal bar frame forward through the medium of a draw link 53 attached thereto and hooked around the universal bar 54 of said frame 49.

In the present improved typing mechanism, the universal bar frame is supported by members 60 and 60' (see Fig. 2) and said members may press against members 62 and 62' and machine screws 61 and 61' may fasten said members securely and said screws may force members 62 and 62' tightly against frame 2 and the screws may be screwed deeply into said frame 2. Universal bar frame should move easily and lightly at each key-stroke. Its movement is very slight and is possibly still less as to the upper portion 50 of the universal bar frame 49. The universal bar 54 of Figs. 1 and 2 may be constructed so certain parts are of the usual diameter, and the draw link 53 of Fig. 3 may draw the universal bar 54 forward in the usual manner and move the ribbon vibrator 4 and the ribbon the usual distance upward. For certain letters of the alphabet, I increase the diameter of the universal bar 54 slightly and for these letters, the draw link 53 of Fig. 3 will cause the ribbon to move upward a greater distance and the said letters will strike the carbon paper or other ribbon in a lower zone or path; and for certain other predetermined letters on the type-bars of the typing mechanism, I will increase the universal bar's diameter approximately $1/64$ of an inch more, and this will cause the draw link 53 to move the ribbon vibrator 4 upward a greater distance and will cause the type fastened to certain type-bars to strike the ribbon in a third zone or path a desirable distance from the path above or the path may be such as slightly overlaps the path above and I may continue the same process of increasing the diameter of the universal bar 54 for greater movement upward of ribbon vibrator 4 which causes the additional predetermined type letters to strike the ribbon in a still lower zone or path. I may have a difference of slightly more than $1/64$ of an inch in the different increases in the diameter of the universal bar 54. Much depends upon the size of the metal type used on the type-bars of the typing mechanism or machine as to this matter. I arrange to hang the universal bar frame suitably so as to get a slight movement of same above.

While the spring shown (49–a) in Fig. 1 helps support the universal bar frame 49 in proper position, I regard of considerable importance the fact that the universal bar frame 49 is supported below by metal blocks 60 and 60' which are securely fastened to the frame of the typing machine by means of screws 61 and 61' shown in Fig. 2. The improved universal bars are shown in Figs. 2, 4 and 5. In Fig. 2, the universal bar 54 and 54' is in one piece but the half of the bar marked 54 is of lesser diameter than the half marked 54' and the letters of the alphabet written with keys which move the links that move the half of the universal bar 54' (and of course they may cause the entire universal bar to move) will cause the type characters denoting said letters to write in a lower path on the inked ribbon than will be the case when the links of other characters and letters move against the part of the universal bar marked 54 which is of standard or usual diameter. The universal bar is supported also in the usual way by being supported at each end by upright metal pieces which may be termed struts and these assist in holding the universal bar securely as a part of the universal bar frame 49. The strut in Fig. 2 at the right is marked 50–a. This strut 50–a is secured at its upper end to the frame member 50. Strut 50–a is suspended from the outer end of a bracket 50–b secured to the frame of the machine by screws 50–c. I have made careful, lengthy tests with a typewriter equipped with my invention simply as to the universal bar and my new folded ribbon invention, using pull rolls to pull the ribbon through the ribbon guide and through the vibrator and around a guide pulley and through the pull rolls themselves so the ribbon moved into a waste area, but at no time was the universal bar supported underneath. Instead it was suspended in the usual, standard fashion from above without any of the suspension means added by me as illustrated in Fig. 1 and as mentioned hereinabove. With this machine, I successfully get writing in two paths on the $5/16$ inch width ribbon. However, for the most efficient use of the ink supply of the ribbon, it is necessary, so far as my present experience and knowledge goes, to have changes made in the present, usual way of suspending the universal bar frame and the universal bar itself. There are other ways of causing the ribbon to move to various heights in the typing station during the operation of the keys by the typist and I have developed a simpler, inexpensive way illustrated in Fig. 21 and Fig. 22. Referring to metal bar 45 of Fig. 1, which extends over to the upper portion of frame 49 and which slightly restricts the movement of the upper portion of the universal bar frame 49 on the right-hand end, the said bar 45 being fastened loosely to the said frame; and referring to spring 49–a which restricts the movement of the frame 49 on the left-hand upper portion, these members 45 and 49–a are not used in the typing machine wherein I may use simply the new type of universal bar shown in either of the Figs. 2, 4 or 5 and members 45 and 49–a are not used with the inexpensive, simple invention of Figs. 21 and 22.

In Fig. 22, a ribbon guide for the inked ribbon 5 is shown as a part of the rod 10–b which is moved up and down inside the tube 10 during operation of the typing machine. Referring now to Fig. 21, the tubes 10 and 10' are similar but tube 10 is longer and permits more movement (higher) of the ribbon. The metal member 10–c to which the tubes 10 and 10' are fastened is a metal scale of the type employed in the Burroughs typewriter which has large size especially in its central portion. The ribbon guide 33 of Fig. 22 is exactly the same construction for each of the rods 10–b and the ribbon guides 33 face directly towards the writing paper and cannot be seen in Fig. 21. Ribbon guides 33 are securely fastened to the rods 10–b by welding or otherwise. The triggers 10–d are a part of the ribbon vibrator. This vibrator 4 for one of the standard typewriting machines may be seen at 4 of Fig. 27. For the form of my invention shown in Fig. 21, I do not use ribbon guides 33' shown in said Fig. 27. The lower portion of vibrator 4 shown in Fig. 27 cannot be seen. The upper portions of the vibrator 4 which ordinarily hold the robbin and guide it are slightly different in the Burroughs typing machine from what is shown in Fig. 27 at the upper end portion of the vibrator 4. I have portions of the vibrator which extend upward and back of the type-bar guide 86 to either side of same for a suitable distance. In using the typing machine, triggers 10–d, with ribbon guides 33 holding the ribbon, force rods 10–b upwardly in tubes 10 and 10'. Rod 10–b when down as far as possible is closer to trigger 10–d than the rod 10–b on the left; also the right-hand tube 10 is longer and rod 10–b can move upward a slightly longer distance at each key movement and type-bar movement during operation of the typing machine. Tubes 10 and 10' are too small at their upper ends for the rods to pass through the same. Of course the ribbon 5 moves upwardly whenever the rods move upwardly and a fast typist will write in portions of two paths on the $5/16$ inch width carbon paper or other ribbon. She may write on portions of three paths along the ribbon part of the time on just one trip of the ribbon through the machine and to a waste basket or other waste receptacle. Even if the tube and other apparatus shown just on the right-hand side of the type-bar guide in Fig. 21 be used, better results are had in the use of the ink supply of the ribbon on one trip through the typing machine.

Referring to Fig. 18, the folded ribbon 5 in compartment or container 8 is fed through an opening 8' and over guide roller 9' and through the typing station and through the ribbon vibrator 4 and then through pull gears 9 and 11 and to a waste area or a waste receptacle. In this form of my invention, all of the parts shown on the right-hand side of Fig. 26 may be entirely eliminated from the typing machine, as well as the transverse shafts and their gears. All of the parts shown in Fig. 26 on the left-hand side which have to do with reversing a ribbon spool may also be eliminated since the ribbon used in the invention of Fig. 18 goes into a waste area or waste receptacle.

In Figs. 6, 7 and 8 of the drawings, means of extremely simple and inexpensive type have been developed for the feed of the ribbon as well as its pull. In these views, the spring drum is indicated at 120–a. This drum carries the gear 120 which meshes with pinion 119 on one end of the horizontally disposed shaft 112. This shaft is suitably mounted in supports 118 and 123. The far end of shaft 112 is provided with a worm gear 117 which is in mesh with a spur gear 114 mounted on a short shaft for rotation in the machine frame. The gear 114 is in mesh with a gear 116. Gears 115 and 116 constitute pull gears for the ribbon as shown more particularly in Fig. 8. The ribbon in that view passes from the machine over the guide pulley 113, through the guide opening 113–A and downwardly through pull gears (or rolls) 115 and 116 and from thence to the waste area or waste receptacle.

In Fig. 15 of the drawings, there is shown a ribbon feed mechanism for use in connection with that type of machine having a left vertical spool-shaft. In this instance the spool-shaft is indicated at 16–a and it has a square upper end. Gear 15–a is in mesh with gear 9–b. Gear 9–b is mounted on the head 9–a at the outer end of lever 17'. Gear 11–b is rotatably mounted on the head 12 at the outer end of lever 11–a, which is pivotally mounted by a screw 14. The lever 11–a may be grasped and the lever swung about its pivot, thus moving the gear 11–b against the ribbon 5, pressing the ribbon 5 with slight force, medium force or tightly against gear 9–b. As driving gear 15–a rotates gear 9–b, ribbon 5 will be moved by the pressure of the teeth of gear 11–b against the ribbon 5, pressing said ribbon against the gear 9–b, as gear 9–b rotates gear 11–b. Gears 9–b and 11–b may be mounted by ball-bearings in the heads 9–a and 12 respectively so that gears 9–b and 11–b will rotate freely. The teeth of the gears may be of any desired size for any type of typewriter, Teletype machine, bookkeeping machine, auditing machine. I do not limit myself to any particular shape or design of the teeth or of the gears. I may use teeth that are long enough and narrow enough, and with sufficient space between the teeth, to enable the typist to press a substantial length of ribbon and crimp it considerably if that be desirable, since that makes it possible for the typist instantly to increase the speed of travel very materially (up to 60 percent or more) of the inked ribbon through the typing station. The typist may press gear 9–b so it meshes with gear 15–a very closely; and she may move gear 11–b so it meshes with gear 9–b, and the teeth of gear 11–b may press the ribbon 5 deep down into the openings between the teeth of gear 9–b; or the gear 11–b may be set by the typist to press the ribbon 5 only a medium amount so the ribbon does not go so far into the openings between the teeth of gear 9–b; or she may set the gear 11–b in such position that its teeth only press ribbon 5 a slight distance down between the teeth of gear 9–b. Any suitable means may be used for placing the gears 9–b and 11–b in certain desired positions so that once the typist has so placed them in the places she prefers for the amount of crimping of the ribbon she wishes, said gears will remain indefinitely in such positions until she quickly changes their positions when it becomes desirable for her to change the speed of travel of the ribbon through the vibrator.

In my co-pending application Ser. No. 284,251 further information is given on this subject and the drawings show just how the gears are fastened to the typing machine. Machine screw 14 is so constructed that it holds well indefinitely and permits the lever 11–a (also the lever 17') and its gear to be moved as desired and it remains where it is set until the typist has need to move it to a new position. With a smaller gear than gear 15–a mounted on shaft 16–a, the speed of travel of ribbon 5 may be much decreased. With a larger gear than gear 15–a mounted on shaft 16–a, the speed of travel of ribbon 5 may be greatly increased, and the speed may be further substantially increased by the typist setting the levers for the teeth of gears 9b and 11b to crimp the ribbon 5 severely as explained in detail hereinabove. This matter becomes of more importance when large type are used such as gothic or roman type.

Reference is made to Figs. 8, 9, 10, 11 and 12 of my U. S. Patent No. 1,826,568 and to the lengthy, detailed description of said figures in same, and all of said description and said drawings are made a part hereof as fully as if they had been copied herein and copies of the drawings added hereto.

In Fig. 10 of said patent, shaft 38 is shown with a bevel gear 37 in mesh with bevel gear 36 on the lower end of spool-shaft 34. Spool shaft 34 while shown on the left in said Fig. 10, is the shaft that is used on the right end of shaft 38, with gear 37 meshing with gear 36 of spool shaft 34. Referring to spool-shaft 33 of Fig. 8 of said patent, said spool-shaft 33 has a bevel gear 35 fixed on the lower end. Drive shaft 41 of said Fig. 8 of said patent has a worm gear 40 near the bevel gear 35 on spool shaft 33. In the form of applicant's invention which uses a narrow carbon paper ribbon for one-time use and as used in the typing station it gradually passes to a waste receptacle or compartment, there is no need for the transverse shaft 38 and its gears as shown in my said patent, and no need for spool-shaft 34 (unless it is desired to feed a ribbon from left to right in which case the pull-gears may be used on the right-hand side of the typing machine and the left-hand spool-shaft may be eliminated or in some cases it may be desirable to equip the machine with pull gears on both sides of the machine) which is usually on the right-hand side. There is no need for worm gear 40 of said patent for one form of the present invention but applicant may substitute for said worm gear a suitable bevel gear that would drive a suitable bevel gear on spool-shaft 33. Referring to drive shaft 41 of said patent (Fig. 8) with its universal joint connection 42 at its rear end with a stub shaft 43 journalled in the frame-work of the said machine, this universal joint connection and the stub shaft may be entirely eliminated for one form of my present invention in which I employ a narrow carbon paper ribbon which is used in a typing mechanism which has no ribbon spools between the platen and the typist, and one drive shaft is sufficient for driving the pull means of the drawings of the present invention. (Please see Figs. 8 and 10.) I may also eliminate the line-lock-crank and the line-lock-bail from one form of the present invention; also the ribbon reverse mechanisms and the supporting structure; and also the various metal parts of said machine which are commonly used for shifting the ribbon entirely aside so the type may be used in cutting stencils; and also the usual housing employed about the ribbon spools and below them; and I may finish the frame of the machine in rough, ugly fashion and use a handsome casing which is attached to the cabinet or desk which supports the machine when it is in use. If the cabinet or desk is of wood, then the casing may be of wood too. The casing may be made of plates or members which may be shipped knocked down and they may be later attached quickly to the desk. If the cabinet or desk is of metal, said plates or members may be of metal but so made that they are readily attached to the desk and are a part of the desk or cabinet, as well as acting to give the machine handsome and attractive appearance. Or I may attach a handsome, easily removable box or case to the machine itself. The desk or cabinet may be as shown in Figs. 9, 16, 17 and 19. The desk or cabinet of my invention for use with the typing mechanism, which employs carbon paper ribbons or other suitable ribbons for beautiful writing which always has good color and neat outlines, may be equipped with one or more compartments for supporting one or more disks or spools suitably supported on ball-bearing mechanisms carrying one or more rolls of carbon paper ribbon or other ribbon for one-time use with suitable guides and means for guiding one or more of said ribbons into a typing mechanism supported on a suitable shelf or other member of the said desk or cabinet, and suitable means for drawing said ribbons as needed to the typing station of said mechanism and to a waste receptacle or compartment. Each roll of said ribbon may have on at least one face adhesive means which cover the entire face or a portion of said face, or a portion of each of the faces of each roll of inked ribbon. The adhesive means used may also be strips of suitable width of adhesive tape for securing the side edges of the convolutions of inked ribbon so that when unwinding the ribbon cannot drop down below the disk or spool and so the disk or spool may be safely filled with the said ribbon at the outset when a supply is installed ready for use by the typist. The frame of the typing mechanism may be a skeleton frame with a finished box or casing of any desired shape for enclosing much or all of the said machine or typing mechanism for giving the typing mechanism handsome appearance and yet at the same time decreasing the cost of making the machine and making it a quicker easier operation to attach various parts of the machine to the skeleton or rough inexpensive, unfinished outer plates with no danger of soling them unduly since they will not show anyhow. At present typing machines are usually built with very expensive frames which are beautifully and expensively finished in colors.

Referring again to Fig. 18 of the drawings, there is illustrated a familiar type of typist's desk wherein tiers of drawers are arranged at the side of the shelf which supports the typing machine. Usually there is a large waste space between each side of the said machine and a drawer of the disk. I propose to utilize these spaces for holding a bulk supply of folded, inked ribbon 8 on one side and for a waste receptacle (or waste area) on the opposite side. In Fig. 18 it will be observed that the folded ribbon supply housed in a container is a considerable, bulk supply extending some distance to the rear of the desk 100–D and that the container fits neatly between the side of the typing machine 1 and the side of the adjacent drawer of said desk. Also the container at the opposite side of said desk and between the machine and another drawer of said desk, is of sufficient size to receive a substantial amount of used or expended ribbon. This waste container is 8–a. It is correctly located for ribbon to fall therein.

Fig. 19 illustrates a further modified form of desk involving my invention. In this form of desk the top is provided with upstanding, specially and suitably placed typing machine side plates 102 and 103, spaced apart sufficiently to accommodate a typing machine between them having unfinished side plates, and the side plates 102 and 103 serve as permanent, beautiful outside side plates for various successive machines for years and during the lifetime of the desk. Plates 102 and 103 may be screwed to the desk top or fastened with suitable pins such as dowel pins at 128 and with sockets of suitable shape. To the right of desk 100–E are compartments 104, 105 and 106 which may be used for folded inked ribbon or for rolls of inked ribbon for use in said typing machine. It will be understood that the ribbon will pass from the topmost compartment first through an opening in the side of said compartment (104) into the said machine from whence it may pass through the typing station of the typing machine and be engaged by a pair of pull rolls between which it passes after being used, and thence to a waste area.

In Fig. 25 I have illustrated a further modification wherein a zig-zag, folded (or accordion pleated) inked ribbon is to be used in a typing machine equipped with my invention. In this Figure 25 I have illustrated a side plate 201, the lower edge of which may be hinged (or movable). Please see hinges 202. The small, rough, unfinished plate on the side of the typing machine is 200. The finished, beautiful side plate 201 is of such design as to conceal plate 200 when plate 201 is closed. The closing means for holding the long side plate 201 are the fastening means illustrated at 206 and 207. Plate 201 may correspond in part with a plain, rough plate 200 in size as to the typing machine's front portion and the two may approximately correspond in design; and a folded ribbon compartment (or a compartment for the use of rolls of ribbon) is shown at 203. This compartment is housed by the long, side plate 201 lying open in Fig. 25 and a similar long, side plate on the opposite side of typing machine 1 and on the opposite side of compartment 203; and said compartment 203 is also enclosed by a top plate 204 and an end plate 208 of Fig. 25.

The zig-zag folded ribbon is indicated at 5 and passes from the compartment and under a guide 209 and into the typing machine 1. As already described, the ribbon then passes through the typing station and about a guide pulley 30 shown in Fig. 15 and between pull gears (or pull rolls) 9–b and 11–b of Fig. 15 and into a waste area or receptacle. This zig-zag folded ribbon is contained in compartments or boxes or special packages self-imposed upon one another in the large, special ribbon compartment 203 and this compartment is in the rear of the platen 3 and compartment 203 is in the rear of the entire typing mechanism. The five boxes 210, 211, 212, 213 and 214 each contain a stack of zig-zag folded ribbon. Each box is open at the right-hand end and as soon as the ribbon in the top box, 214, has been used, ribbon is drawn from box 213 and as soon as the ribbon in box 213 is exhausted, ribbon is drawn from box 212 and so on. When the bottom of box 214 is reached, the folded ribbon extends from the bottom of box 214 horizontally with box 214 to the open end of box 214 and the ribbon is fastened with very thin adhesive tape such as Scotch tape, to the ribbon extending from the top of box 213, and this same system is followed until all of the ribbon has been used from the five boxes. It is obvious that since the ribbon is only 5/16 of an inch wide, several stacks of ribbon may be inter-connected so as to provide a bulk supply for the comfort and convenience of the typist. The Scotch or other tape used may be of a bright red color so as to attract the attention of the typist and the small joint will come at rare intervals if the boxes of folded ribbon are as large as indicated in Fig. 25. The movable side plate 201 may be provided with snap fasteners for closing the side plate on each side of the typing machine.

In Fig. 12, I have shown a roll of inked ribbon and it will be understood that its diameter may be of any size desired or which is suitable for the particular typing machine employed. This roll of ribbon 136 of Fig. 12 may have strips of Scotch or other suitable adhesive tape fastened to it as shown at 131, 132, 133, and 134 of Fig. 12. The core of roll 136 is indicated at 135. The inked ribbon wound about core 135 may be very thin. Ribbon 5 may be wound extremely tight in helical fashion. Said ribbon may have ink on one face only and when wound in superimposed convolutions may define faces of a thin, compact package of ribbon and a non-liquid adhesive material fastened to cellophane or other thin material to form a tape similar to Scotch tape, may secure at least portions of said side faces to retain said convolutions in superimposed relation to and on said core. I do not limit myself as to the coverage of the said roll of ribbon with adhesive tape but may cover parts of both faces of said roll, or all of one face of said roll, or all of both faces of said roll of inked ribbon. I may use a roll of ribbon inked on one face, which constitutes a bulk source of writing ribbon for a typing machine and the opposite faces of said roll may be substantially parallel and plane and said roll may have Scotch or other suitable adhesive tape on one or both faces and said adhesive tape may extend out to the extreme edges of said roll so as to prevent the ribbon from accidentally or casually becoming in part unwound. On the under side of said roll of ribbon I may use an adhesive of non-crystallizing character which is overlaid by a non-adhesive protecting cover. I never employ a liquid adhesive which could soak into the edges of the inked ribbon which carries ink on one face only. The ribbon may be of synthetic or other sheet material wound helically about a core of any suitable diameter in superimposed convolutions, the side edges of said convolutions defining side faces of a thin compact package of inked ribbon and adhesive means which is non-liquid may be secured to said ribbon.

At 215 and 216 of Fig. 10 and at 137 of Fig. 11 and at 130 of Fig. 14, zig-zag folded ribbon or the containers for such ribbon are illustrated. This is also true as to container 8 of Fig. 18 and it is true of the boxes or containers of ribbon 210 to 214, inclusive, of Fig. 25 described hereinabove. It will be understood that the zig-zag folded ribbon will be provided of the correct or desired width and length. This ribbon will be folded upon itself in zig-zag fashion tightly and tightly enclosed within one or more suitable containers of any size desired. And it will be understood that a series of containers having folded ribbon therein may be associated together, with the ribbons inter-connected, so as to provide a ribbon that will last in a busy machine used by a fast typist for months before her supply of ribbon needs replenishing. And she will not have to clean the type of her machine and she will not have to remove any spool of ribbon from her machine at any time, in certain forms of my invention herinabove described. If the typist prefers to use a machine for certain typing uses which does wind up the used ribbon, this may be done in connection with the folded ribbon or even in connection with one or more rolls of ribbon. I do not limit myself to typing machines which may use my other inventions described herein but which do not use spools for winding expended or used ribbon.

One of the containers of folded ribbon is shown in Fig. 11 wherein 129 represents a carton while 137 represents the end of a zig-zag folded ribbon protruding from said carton. In Fig. 13 there is represented a larger carton than is shown in Fig. 11. And the carton of Fig. 13 will properly hold a series of smaller cartons of zig-zag folded, inked ribbons. These ribbons may be interconnected as already described hereinabove in connection with the folded ribbons of Fig. 25. The folded ribbon may be dispensed at opening 217. The top of carton 129-A may be cut back as the ribbon boxes within are emptied during operation of the typewriter or other typing machine by the typist. One advantage the folded inked ribbon has over a roll of ribbon is that once the boxes of folded ribbon are empty they may be thrown away. There is no expense for the various items of equipment required in using real large disks or reels of ribbon and ball-bearing mounts are not needed.

In Fig. 14, I show a diagrammatic figure illustrating the manner in which the ribbon 130 is folded in zig-zag form. The ribbon is purposely spread out much further than usual just to illustrate the zig-zag folding. It will, of course, be understood that it is desirable to keep the ribbon in compact form when it is in use in the machine or in a compartment near the machine in order that as long a ribbon as possible be accommodated in small space. By using two or more boxes of folded ribbon in a compartment below the typing machine or to the side of it, or in the rear of the machine as in Fig. 25, or in any other suitable location, the purpose is to give the typist a bulk supply of ribbon good for months of use. In the foregoing I have described the use of ribbons inked on one face only in folded form or in rolls. Suppose the type during operation of the typing machine, contact a sharp folded part of the inked ribbon, perfect typed impressions will be had nevertheless as I have found during much use of the folded ribbon in typing. Moreover, the tensile strength of the inked ribbon is not impaired in any degree by the zig-zag folds. From the foregoing it is apparent that I have provided means whereby in an efficient and every economical manner, month after month in the hands of a rapid, expert typist, typed impressions may be made upon sheets which are consistently beautiful, of rich color at al ltimes, neat and printlike, and clean-cut throughout. This is accomplished by the thinness of the ribbon, the clean, wax-containing ink used, on just one face of the ribbon, and the fact that the amount of ink and the color of the ink for each impression is just right and the ribbon is long enough to last for months before a new supply is required, except in cases where the typist or her employer prefer the shorter ribbons. I do not limit myself to the very long carbon paper ribbons of the folded type described hereinabove but may use synthetic ribbons, fabric ribbons and ribbons cut from film called nylon film or Mylar polyester film or other types of wide material or narrow material either woven or non-woven and whether for typing machines such as mentioned hereinabove or for other kinds of typing machines including ink fountain typewriters.

With the apparatus hereinabove described and the equipment and ribbons described, typists of usual typing ability and having no unusual mechanical ability or skill, can easily adjust the rate of travel of the ribbon in the machine.

Referring to bar 45 in Fig. 1, this may be screwed to bar 219 as well as to the universal bar frame or fastened to said frame in any other suitable manner.

Referring to Fig. 9 which is described briefly in column 10, lines 57–62 hereof, 86 is a typebar guide, 109 represents a very large compartment in the rear of the platen and in the rear of the typing machine itself. Compartment 109 is for a bulk supply of ribbon. 101 represents the top of the desk; 107 and 108 are compartments for office supplies; 110 is for used ribbon; 111 may be used for new ribbon; 124 and 125 are hinges of the long cover 221 of the typing machine 1; 126 is the long side plate; 127 is the entire desk; 220 represents the rubber feet under the typing machine 1 and its addition on the left-hand side; 221 is the cover over a portion of typing machine 1. This invention of Fig. 9 is an improvement of the desk invention of Fig. 12 of my co-pending application 284,251 filed April 25, 1952.

Referring to Fig. 3 of the drawings of the present application, this was taken largely from Fig. 8 of my U. S. Patent 1,826,568 and a full description of all of the details of Figure 3 may be found in that patent in the description of Fig. 8. 49 represents the universal bar frame and 54 represents the universal bar just as in Fig. 1 of this application; 53 is a draw link for moving the universal bar 54 forward; 41 represents a drive shaft and 40 is a driving worm gear; 42 is a universal joint connection; 43 is a stub shaft; 44 is a loose pinion on stub shaft 43. The desk or cabinet may have one or more compartments under the typing mechanism and it may have one or more compartments to the right or the left of the typing mechanism, or it may have such compartments wherever desired, and each compartment may support and contain a suitable ball-bearing mechanism and one or more disks or spools supported on said ball-bearing mechanism and said disks or spools may be full of suitable ribbon for feeding to the typing station of the said typing mechanism as desired by the typist. However, I do not limit my use of one or more rolls of ribbon to a typing mechanism and desk arrangement such as described but may use a desk which has as a part thereof an attractive, detachable or non-detachable means for serving as an attractive covering or casing for an unfinished typing mechanism having a rough, skeleton frame and having the ball-bearing or other mechanism for supporting one or more rolls of ribbon supported in one or more compartments which are a part of the typing mechanism itself. And the typist may also use an ordinary desk or cabinet with the typing mechanism and the typing mechanism itself may have special side members or plates and these may be sufficiently long to extend some distance in the rear of the typing mechanism. Such side members or plates may serve as the sides of a compartment of the typing mechanism which also has a back plate and a cover plate, if desired, and said compartment may hold the ball-bearing or other suitable mechanism which supports one or more disks or spools of inked ribbon and said mechanism may have pull means for drawing one or more of said ribbons from the rear into said typing mechanism and through the typing station and to a waste compartment which may be very near said typing mechanism. And said typing mechanism may or may not be equipped with means for using the ink from any ribbon fed through the typing station for one-time use, so that substantially all of said ribbon's ink is efficiently and well utilized for beautiful writing of rich color or of any color desired, in print-like impressions which are never too light and never too dark or too heavy. Also, as heretofore explained in this application, two ribbons may be used simultaneously with fine results for certain classes of work and the typist may almost instantly change back to using just one ribbon for her regular work. And this may be done without having to remove a spool of ribbon or a disk full of ribbon or having to remove a spool or disk of ribbon, and without having to do any ribbon winding into a spool of any type or design. And the typist may always have the right amount of ink for the best results.

In my pending application Ser. No. 284,251, filed April 25, 1952, it is clearly stated that the common practice today is to use typewriters equipped wtih fabric ribbons which feed too much ink to the writing paper when new and that soon wear down to dim or gray writing and the results are positively no better than thirty or forty years ago. The typewriters are much more expensive to build than the present typewriter from which I have eliminated so many parts as of no value whatever to the typist. And the new typing machine with its simple construction may use inexpensive, large rolls of carbon paper ribbon or thin, synthetic ribbon for one time use, inked with the same wax ink that is commonly used for inking carbon paper ribbons or any of the inks mentioned in my application Ser. No. 188,592, filed October 5, 1950, now U. S. Patent No. 2,695,092 or any other suitable inks.

One form of my invention has been described in detail hereinabove and is illustrated in Fig. 19 hereof, showing the finished, outside attractive plate which may be to cover up a skeleton, rough plate of the typing mechanism and may be fastened to the typing mechanism itself and may also form a part of the rear compartment enclosing one or more rolls of ribbon mounted on a disk or on a spool or spools arranged to unwind lightly and easily by ball-bearing means. This finished plate may be on hinges as a part of the typing mechanism or it may be fitted close to said mechanism but removably fastened to the desk itself. If the finished side plates are of wood or of metal, and are fastened detachably to the desk itself, they may be fastened with wood or metal pins or anyway. Also mounted on said desk or cabinet and with the side plate of either the left-hand side or the right-hand side almost touching the same, may be suitable members for guiding the ribbon or ribbons into the typing mechanism and one or more guides or pulleys for use as the ribbon is drawn or pulled by suitable means over to and through the typing station and then to a waste receptacle or compartment. For some makes of machines, it is simpler to have the ribbon pass inside the plate on one side of the machine and for other makes, the other side if it is more suitable and more efficient. Or if desired a supply of ribbon could be fed from compartments arranged on both sides of the typing machine. (See Figs. 12, 16 and 17 of pending application Ser. No. 284,215.) However, in that application I do not describe the detachable side plates of the typing mechanism and do not describe the side plates as being a part of the cabinet or desk for easy removal and to cover up the ribbon, or conceal it as it travels into the typewriter.

I claim as my invention:

1. A typist's apparatus including a modern typing machine having a segment and a stop-ring for type-bars and a narrow carbon paper typewriter ribbon; pull means for said carbon paper ribbon; a suitable receptacle for said ribbon in the rear of said machine; extra long side plates for said machine which serve also as side plates for said ribbon receptacle; said machine also having means for giving writing on one trip of said ribbon through the said machine and through the said pull means from at least two paths along the face of said narrow carbon paper ribbon, over a width at least twice the height of the type of said machine, and said ribbon receptacle being outside said machine proper.

2. A folded carbon paper typewriter ribbon for use in a carbon paper ribbon typing machine, said ribbon being not more than one-half inch wide and being zig-zag folded, the folds being not more than two feet apart; and said ribbon being suitable for use through a ribbon vibrator of said machine in a vertical position as the ribbon is used in writing in said machine.

3. A carbon paper typewriter ribbon for use in a carbon paper ribbon typing machine, said ribbon being not more than one half inch in width and being cross-wise folded; and the said ribbon being free from ink on that face which the type contact.

4. An apparatus for typists including a container holding at least one stack of zig-zag, folded carbon paper ribbon less than half inch wide, for use in a carbon-paper-ribbon typing machine.

5. A typist's apparatus including a modern, carbon paper ribbon typing machine equipped with a carbon paper ribbon not less than ¼ of an inch wide; said machine including a segment and stop-ring of conventional, modern type; a ribbon vibrator; pull means on the left-hand side of said vibrator for advancing said ribbon at a constant rate of speed; a container of zig-zag, folded, carbon paper ribbon in stacks arranged side by side, being a part of the ribbon in the said machine and said container of ribbon being located near the said machine, and said ribbon being a typewriter ribbon suitably arranged for easy movement from said container through said vibrator as said pull means pull said ribbon through the said vibrator and through the said pull means.

6. A typist's apparatus including a spoolless, modern carbon paper ribbon typing machine including a segment and stop-ring of modern, conventional design and said machine being equipped with a zig-zag, folded, carbon paper ribbon which serves as a typewriter ribbon; stacks of said folded ribbon lying side by side in a suitable container to the right of said machine, suitably supported; said ribbon in said machine being a portion of the ribbon in said container; and said machine including a universal bar frame and a universal bar having a plurality of diameters; links associated with said universal bar; a ribbon vibrator operable by said universal bar; a carriage and platen; type-bars and type; pull means for said ribbon on the left-hand side of said vibrator; and said links associated with said universal bar being operated by said type-bars for moving said vibrator and said ribbon to various heights during one trip only of said ribbon through the said vibrator and through the said pull means so that a type impression pattern may be made embracing substantially a solid path on said ribbon at least twice as wide as the height of the type of said machine; and said type impressions crowding each other on a face of the ribbon over said wide path; and said ribbon at all times giving impressions of rich color; and said machine being equipped with dull-edged, which is at least as small as pica type.

7. A carton of folded carbon paper typewriter ribbon, the folds being not more than one foot apart and said ribbon being suitable for use through a ribbon vibrator of a visible-writing typing machine and being not more than 3/8 of an inch wide, said folded ribbon being of much greater length than the length of any present conventional typewriter ribbons used in typing machines with spools, and said ribbon being for use in a typing machine that has conventional type-bars and type, anvil and carriage, draw links of suitable lengths and sizes, and means for making impressions on said folded carbon paper typewriter ribbon that are in a pattern that is unconventional with the impressions in more than one path thereon.

8. In a typing machine for visible writing, having a ribbon vibrator and type-bars and type, a segment for said type-bars to move in, a stop ring and anvil for said type-bars to strike against when in use in making impressions from a ribbon; a carbon paper ribbon, inked on one face only and not more than 5/16 of an inch wide; a carriage; a platen; keys and key-levers; a universal bar having at least two diameters and being a straight bar located at the lower part of the universal bar frame, said universal bar being operatively connected to said ribbon vibrator; pull means for said ribbon; links moved by said type-bars, for moving said universal bar and for moving said ribbon vibrator up and down different distances as said pull means pull said ribbon through said vibrator and through said pull means whereby writing of rich color is secured and a type impression pattern is made on the inked face of said ribbon over a space approximately twice as wide as the height of the type, and said pull means pulling said ribbon through said vibrator and through said pull means at a rate of travel not more than one-third to one-fourth the rate of travel of the said carriage; and said type impressions on said ribbon being close to each other over said substantially continuous space on the ribbon, and said ribbon making just one trip through the said vibrator and pull means.

9. A typist's apparatus including a visible writing typing machine having a segment for type-bars; a stop ring for type-bars; conventional type-bars; a universal bar having a plurality of sizes and being approximately a straight bar; a ribbon vibrator operable by said universal bar; a carbon paper ribbon not more than 1/2 of an inch wide having a tough paper base in said machine and being part of a roll of said carbon paper; pull means for said ribbon; a carriage and platen; a receptacle for said roll of carbon paper ribbon in the rear of said machine; extra side plates for said machine which extend alongside said machine's side plates to the rear of said receptacle and serve as side plates for the latter; means associated with said universal bar and operable by said type bars for enabling said machine to write so as to form a type pattern on the inked face of said ribbon over a width at least twice the height of said type, on just one trip of said ribbon through said vibrator and said pull means; and said machine giving approximately four inches of writing for each inch of ribbon used.

10. A typist's apparatus including a modern, correspondence, typing machine having a segment for type-bars; said segment having a stop ring for type-bars; and said machine having conventional type-bars carrying elite type; and said machine being equipped with a tough paper ribbon having a substantial supply of ink and having the face of the ribbon towards the type free of ink; and said machine having a vibrator, a platen, keys and key-levers, pull means for said carbon paper ribbon, a guide pulley for said ribbon on the left side of said vibrator; a universal rod frame in said machine having a universal rod with a plurality of sizes operatively connected to said vibrator; means associated with said type-bars and said universal rod to move said ribbon so as to form a type pattern on the inked face thereof over a width wider than the usual pattern made by elite type of a typing machine; and said pull means for said ribbon lying below the said guide pulley and serving to pull the said ribbon through the vibrator and over the guide pulley and down between the said pull means.

11. A typist's apparauts including a typing machine having a vertical, slotted segment for type-bars and said segment having a stop ring for type-bars; said machine being equipped with a carbon paper typewritter ribbon approximately 3/8 of an inch wide; pull means for said ribbon; a carriage; a platen; a ribbon vibrator; a conventional, suspended, vertical, universal bar frame; a horizontal universal bar which is non-curved and operatively connected to said ribbon vibrator; said bar being located at least a few inches from the said platen and having at least one part larger than any other part; draw links associated with said universal bar; said draw links being of any suitable size and shape and co-operating with said universal bar and with said type-bars for moving said vibrator and said ribbon so that the type impression pattern made on said ribbon during one trip of said ribbon through said vibrator and through said pull means shows that ink was used much of the time from the said ribbon over a width approximately at least twice the height of the type of said machine; and said carbon paper typewriter ribbon being a portion of a bulk supply of said ribbon suitably located for use in the said machine in writing.

12. A typist's apparatus including a typing machine having a vertical, slotted segment for type-bars and said segment having a stop-ring; said machine being equipped with type-bars and type; a carriage; a platen; a vibrator; a carbon paper typewriter ribbon of narrow width; ribbon guides with openings approximately sufficient for a ribbon 3/8 of an inch wide; pull means for said ribbon; a non-curved universal bar and universal bar frame, said universal bar being operatively connected to said vibrator; draw links associated with said universal bar; said universal bar being suspended in conventional manner and having at least one part which is larger than all the rest of the said bar; and said draw links being of any suitable size and shape and co-operating with said universal bar and with said type-bars for moving said vibrator and said typewritter ribbon, to form a type pattern on the inked face of the ribbon over a width at least twice as great as the height of the type of said machine, on just one trip of said ribbon through the said vibrator and the said pull means; and said non-curved universal bar lying in an approximately horizontal position; and said universal bar frame and said universal bar being suitably supported underneath the same for light, easy movements as said draw links are moved one at a time by the type-bars thereby moving said ribbon in transverse direction so as to present different longitudinal zones of the surface thereof to the type at the typing station.

13. A typist's apparatus including a typing machine having a vertical, slotted segment for type-bars and said segment having a stop-ring; said machine being equipped with type-bars and type; a carbon paper typewriter ribbon; a ribbon vibrator; a carbon paper ribbon bulk supply which may be part of the ribbon in said machine; said paper ribbon being free from movement when the space bar is moved; and said machine having a carriage; a platen; pull means for said ribbon; ribbon guides; a universal bar and a universal bar frame arranged suitably, said universal bar being operatively connected to said ribbon vibrator; draw links of any suitable sizes and shapes; and said draw links co-operating with said universal bar and with the said type-bars for moving said vibrator and said ribbon so that the type impression pattern made on the said ribbon during one trip of said ribbon through said vibrator and through said ribbon guides and through said pull means shows that ink was used much of the time from a face of said ribbon over a width approximately twice, at least, the height of the type of said machine.

14. A typist's apparatus including a typing machine equipped with a carriage, a ribbon vibrator, a platen, type-bars and type; a carbon paper typewriter ribbon of narrow width which is free from movement when the space bar is moved; ribbon guides; pull means for the said ribbon; a non-curved universal bar which is part of a universal bar frame; draw links of any desired lengths associated with said universal bar and operable by said type-bars; and means for moving said vibrator and said ribbon during the movement of said type-bars and said draw links and said universal bar so as to form a type impression pattern on said ribbon, during just one trip of said ribbon through said vibrator and through said guides and through the said pull means, over at least two paths on a face of said ribbon with the impressions made by the type crowding each other closely and some of the type impressions overlapping; and said machine having at least two carbon paper typewriter ribbons available for quick use.

15. An apparatus for typists including a typing machine for visible writing, equipped with a carbon paper typewriter ribbon, a ribbon vibrator, a space bar, draw links, type-bars and type, a segment for said type-bars, a stop-ring, said ribbon being inked on one face only and being less than a half inch in width; a universal bar operatively connected to said ribbon vibrator and operable by said draw links; ribbon guides; a carriage; a platen; pull means for advancing said ribbon; and said type-bars moving said links and said universal bar so as to move said ribbon vibrator and said ribbon up and down different distances as said pull means pull said ribbon through the said machine and through the said pull means thereby securing a type impression pattern on a face of said ribbon which comprises more than one path of type impressions with said impressions crowded close together and some of them overlapping; and said draw links being of suitable lengths and sizes; and said universal bar being suitably suspended in said machine.

16. A typist's apparatus including a modern carbon paper ribbon typing machine equipped with a carbon paper ribbon carrying a large supply of ink and having unusual tensile strength; said ribbon being connected with a bulk supply of zig-zag, folded ribbon suitably supported near said machine; all of said ribbon being typewriter ribbon not more than ½ of an inch wide and having one face free from ink; and said machine including a segment and stop-ring of modern, conventional design; and said machine including also a universal bar frame and a universal bar having a plurality of diameters; links associated with said universal bar; a ribbon vibrator operable by said universal bar; a carriage and platen; type-bars and type; pull means; and said links being operated by said type-bars for moving said vibrator and said ribbon to various heights during only one trip of said ribbon through the said vibrator and through the said pull means so that a type impression pattern may be made embracing substantially a path on said ribbon at least twice the width of the usual, conventional path.

17. A typing apparatus including a typist's cabinet with suitable means for closing it completely from both sides; a modern, conventional, carbon ribbon typing machine equipped with a carbon paper ribbon not less than ¼ of an inch wide, supported within said cabinet; a bulk supply of carbon paper ribbon in said cabinet and being connected with the ribbon in said machine; and said typing machine including a modern, conventional, stop ring as a part of a segment; permanent type-bars and type; a carriage which moves the same distance for each impression made; pull means on the left-hand side of the said machine for advancing said ribbon; guide means for said ribbon; a universal bar frame; a universal bar having a plurality of diameters; links associated with said universal bar; a ribbon vibrator operable by said universal bar; and said links associated with the universal bar being operated by said type-bars for moving said vibrator and said ribbon to various heights during one trip only of said ribbon through the said vibrator and through the said pull means so that a type impression pattern may be made embracing substantially a path at least two to three times the width of the usual path made on the ribbon on one trip of said ribbon through a typing machine of conventional type.

18. A typist's apparatus comprising in combination a holder for a supply of carbon paper ribbon not more than 5/16 of an inch wide; a modern typing machine equipped with a 5/16 inch width carbon paper ribbon and having a standard segment and stop-ring; guides for said ribbon; a ribbon vibrator; a pull means for said ribbon; a platen and a carriage; conventional, modern type-bars and type not larger than pica type; a universal bar frame free from contact with said type-bars; a universal bar receiving some support underneath and said universal bar having a plurality of diameters; links operable by said type bars for moving said universal bar and in turn moving said vibrator different distances transversely; and the type for certain, selected letters of the alphabet always marking an upper part of the inked face of the ribbon; and certain other type always marking near the middle of the ribbon; means for moving said carriage at a constant rate of travel that is at least four to five times as fast as the rate of travel of the said ribbon through the said vibrator thereby producing a type impression pattern on the inked face of said ribbon which is much wider than the conventional pattern, with the type impressions crowded and overlapping.

19. A typist's apparatus which includes a typing machine equipped with a carbon paper ribbon carrying a large supply of ink and approximately 5/16 of an inch wide; a modern segment and stop-ring; a ribbon vibrator; a platen and a carriage; type-bars equipped with type not larger than pica; pull means for said ribbon; a suitable supply of said ribbon, suitably and conveniently located which is connected with the ribbon in said machine; a universal bar frame and a universal bar having a plurality of diameters; links for moving said universal bar; guides for said ribbon; said type-bars being conventional, modern, usual type-bars which, during operation of said machine, move said links and in turn move said universal bar and said ribbon and said ribbon vibrator various distances transversely so that certain letters of the alphabet always mark an upper part of the face of the ribbon, certain other letters always mark below the upper part of the ribbon and certain other letters of the alphabet always mark still lower along the ribbon, thereby using the ink from a face of said ribbon with greater economy and efficiency than is conventional and at the same time the writing being of rich color at all times for the entire length of the ribbon which passes through the said vibrator; and the said ribbon being drawn by said pull means through the guides and the ribbon vibrator and the pull means at a rate of speed that is not more than one-third the rate of speed of said carriage; and said segment and stop-ring being stationary at all times.

20. A typist's apparatus including a carbon paper ribbon typing machine with a modern, conventional, stationary segment and stop-ring; type-bars equipped with type no larger than pica type; said machine being equipped with a carbon paper ribbon carrying a large supply of ink, and being not more than 3/8 of an inch in width; a ribbon vibrator; a carriage; a universal bar frame and a universal bar having a plurality of diameters; links for moving said universal bar; pull means for said ribbon; and said type-bars being usual, modern type-bars which move said links and said universal bar and said ribbon and said vibrator transversely in such manner that ink is taken from said ribbon from substantially three-fourths to seven-eighths of the width of said ribbon, as the said ribbon passes through the said vibrator just once; and said ribbon being pulled through the said vibrator and through the said pull means by said pull means at a constant rate of travel during operation of the said typing machine.

21. A typist's apparatus which includes a carbon paper ribbon typing machine equipped with a carbon paper ribbon not more than 5/16 of an inch wide, a ribbon vibrator, a stationary segment and stop ring of modern design, a carriage, type-bars equipped with pica type, pull means for said ribbon; a non-curved universal bar having a plurality of diameters; a universal bar frame; links associated with said bar, being movable by said type-bars for moving said vibrator and ribbon different distances transversely when making impressions on the work sheet, using ink from the face of said ribbon on one trip thereof through the vibrator over a path much wider than a conventional path made by the type on said ribbon, and the type impressions being along the upper part of said ribbon and almost directly below in almost the middle portion of said ribbon and crowded together closely over said wider path, and said pull means pulling said ribbon through the vibrator and through the pull means at a constant rate of speed much slower than the speed of the carriage and of the work-sheet; and said segment being a vertical segment; and said type-bars contacting said stop-ring.

22. A typist's apparatus including a correspondence, carbon paper ribbon typing machine having a modern, conventional, stationary segment with a stop-ring for type-bars; and said machine being a modern machine with type-bars; type having dull, non-cutting edges; and said machine having a strong carbon paper ribbon approximately 5/16 of an inch wide, carrying a large supply of substantially non-drying ink, said ink being free from substantial deterioration as it awaits use up to the end of at least two years; and said machine including a ribbon vibrator; a carriage; a universal bar frame; a universal bar member having a plurality of sizes and being operatively connected to said vibrator; and link members co-operating with said universal bar member and with said type-bars, for moving said ribbon up and down rapidly in a new manner so that the type-impression pattern made on said ribbon during one trip of same through the vibrator shows that ink was used from said ribbon over a wider path than usual, and the type impressions made on said ribbon being crowded closely over almost all of the inked face of the said ribbon.

23. A typist's apparatus including a carbon paper ribbon typing machine equipped with a ribbon vibrator member, and a carbon paper ribbon, a stationary segment, type and type-bars, a type-bar guide, a carriage and platen; keys and key-levers; pull means for pulling said ribbon through said machine at a speed slower than the rate of travel of said carriage; and that portion of said vibrator member lying near said platen and near said type-bar guide having one side thereof of different construction from the opposite side thereof, and the right hand portion of said vibrator member located near the platen being decidedly different in construction from the left-hand portion of said member thereby permitting a different up-and-down movement of the ribbon during operation of said machine from the conventional movement of carbon paper ribbon in the vibrator member of a carbon paper ribbon typing machine.

24. A roll of strong, well inked carbon paper typewriter ribbon for giving printlike impressions of rich color in a carbon paper ribbon typing machine and for giving five inches of such impressions for each inch of said ribbon used even though the impressions are crowded and some of them overlap each other; said ribbon having ink on one face only and being wound in superimposed convolutions defining faces of a thin, compact package of ribbon; and a non-liquid suitable adhesive tape material, such as Scotch tape, on at least one face of said roll, extending out to the extreme edges of said roll so as to prevent the ribbon from becoming unwound.

25. A roll of carbon paper typewriter ribbon made expressly for giving the largest number of typed impressions of rich color in a carbon paper ribbon typing machine and for giving approximately five inches of such impressions for each inch of ribbon used even though the impressions are crowded together in a path which is narrower than the ribbon itself; said ribbon having ink on one face only and being wound in superimposed convolutions defining faces of a thin, compact package of ribbon; Scotch tape or other suitable tape attached to at least one face of said ribbon and to the opposite face a suitable non-crystallizing adhesive being attached which is overlaid by a non-adhesive cover member of suitable type; and all of said adhesive material being non-liquid at the time of use and at the time of application to the said roll.

26. A roll of carbon paper typewriter ribbon approximately 5/16 of an inch wide, having ink on one face only and wound tightly with smooth parallel sides; Scotch tape or other suitable tape attached to at least one face of said roll of ribbon and said tape being overlaid by a cover member of suitable type and of circular shape; and the adhesive material on said tape being non-liquid and non-crystallizing, and said tape being easily removable.

27. A roll of carbon paper ribbon approximately 5/16 of an inch wide inked for very black impressions, and having a strong paper base material, capable of giving five inches of very black impressions for each inch of ribbon used; said ribbon being wound tightly in superimposed convolutions defining faces of a thin, compact package of ribbon; non-liquid and non-crystallizing adhesive attached to at least one face of a sheet material which may be cellophane such as used for Scotch tape, said sheet material being circular in shape and being attached to at least the edge portion of said roll of carbon paper ribbon, whereby the ribbon will be so held together that it will be in little danger of accidental and casual unwinding from the said roll.

28. A roll of carbon paper ribbon approximately 5/16 of an inch wide and having a strong paper base and well inked; said ribbon being wound about a core; said roll being characterized by the presence on at least one of its faces of non-crystallizing, non-liquid adhesive, sheet material such as Scotch sheet, adhesive material, being easily removable and slightly uniting the edges of said roll of ribbon; and said sheet base material being a synthetic sheet material coated with said non-crystallizing, non-liquid adhesive and also causing said ribbon to unwind under slight tension and restraint thereby insuring more efficient feeding of the ribbon to the typing station.

29. A roll of carbon paper ribbon approximately 5/16 of an inch wide having a strong paper base and well inked on one face only; said ribbon being wound about a core; said roll being characterized by the presence on at least one face of adhesive sheet material which is of inexpensive character; and said ribbon being secured near the edge of said roll at least, by such sheet material in the form of a circle, for holding said ribbon in place when mounted on a disk for feeding to the typing station, to the end that said roll of ribbon may substantially fill said disk with little risk of said ribbon falling below said disk, and the adhesive of said sheet material being non-liquid and non-crystallizing.

30. A roll of carbon paper ribbon approximately $5/16$ of an inch wide having a strong, tough paper base and well inked on one face only; said ribbon being tightly wound about a core of any desired diameter; a mounting disk for said roll approximately $1/8$ of an inch larger in diameter than said roll; said roll having inexpensive non-liquid adhesive sheet material on at least a portion of one face of said roll; and said ribbon being secured at least at the edge of said roll and for a few inches back from said edge, by such adhesive sheet material in the form of a circle for holding said ribbon in place when mounted on said disk for feeding to the typing station, to the end that said roll of ribbon will at no time fall down below said disk.

31. A typist's apparatus including a carbon paper ribbon typing machine equipped with a ribbon vibrator means, one end of which is located in said machine where much of it is visible; and said vibrator means being located at its upper end portion, near the upper portion of said machine; and said upper end portion thereof being of different construction on the left portion thereof from the construction on the right hand portion thereof.

32. A typist's apparatus including a carbon paper ribbon typing machine ribbon vibrator member, having one end wider than the other end; and having one part of the wider end of different construction from the construction of the opposite part of the wider end of said ribbon vibrator member.

33. A typist's apparatus including a carbon paper ribbon typing machine equipped with a carbon paper ribbon carrying a large amount of ink and being not less than $1/4$ of an inch wide, a cabinet with suitable doors for closing it completely, a typing machine within said cabinet, a support for said machine, a support in said cabinet for a container of carbon paper ribbon not more than $1/2$ of an inch wide; said ribbon being connected with the ribbon in said machine; and said machine having a conventional segment with stop-ring, type-bars and type; a platen and carriage; a ribbon vibrator; pull rolls for pulling the ribbon through the vibrator and through the pull rolls; a waste receptacle for used ribbon; a universal bar frame and universal bar; links associated with said universal bar and said bar being operatively connected to said ribbon vibrator; guide means for said ribbon; and said apparatus including means connected with said machine for supporting said universal bar frame from underneath to some extent; and said universal bar having a plurality of diameters whereby the type-bars may move the links and the universal bar various distances thereby moving said ribbon and said ribbon vibrator rapidly in transverse direction so as to present different longitudinal zones of the inked face thereof at the typing station for the type to place ink from said ribbon upon a work-sheet from different zones of said ribbon so as to use the said ink from a wider path on said ribbon than conventional and usual on only one trip of said ribbon through the vibrator and pull rolls; and said impressions crowding each other closely over said wider path as the ink is used from different longitudinal zones of the inked face of said ribbon, thereby using the ink from said ribbon with greater economy and efficiency and maintaining a rich color which substantially matches at all times for the entire length of the ribbon that passes through the said vibrator; and said ribbon moving through the guides and the pull rolls into said waste receptacle uniformly and efficiently during the operation of said machine.

References Cited in the file of this patent

UNITED STATES PATENTS

| | | |
|---|---|---|
| 716,701 | Gabrielson | Dec. 23, 1902 |
| 1,433,183 | Cossitt | Oct. 24, 1922 |
| 2,703,623 | Pelton | Feb. 22, 1955 |